(12) United States Patent
Smith et al.

(10) Patent No.: US 11,601,436 B2
(45) Date of Patent: Mar. 7, 2023

(54) INTERNET OF THINGS (IOT) NETWORK DOMAIN RESOURCE MODEL

(71) Applicant: Intel Corporation, Santa Clara, CA (US)

(72) Inventors: Ned M. Smith, Beaverton, OR (US); Nathan Heldt-Sheller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 16/609,711

(22) PCT Filed: Jan. 11, 2018

(86) PCT No.: PCT/US2018/013301
§ 371 (c)(1),
(2) Date: Oct. 30, 2019

(87) PCT Pub. No.: WO2018/208337
PCT Pub. Date: Nov. 15, 2018

(65) Prior Publication Data
US 2020/0067938 A1 Feb. 27, 2020

Related U.S. Application Data

(60) Provisional application No. 62/503,806, filed on May 9, 2017.

(51) Int. Cl.
*H04L 9/40* (2022.01)
*G06F 9/50* (2006.01)
(Continued)

(52) U.S. Cl.
CPC .......... *H04L 63/105* (2013.01); *G06F 9/5077* (2013.01); *G16Y 40/35* (2020.01);
(Continued)

(58) Field of Classification Search
None
See application file for complete search history.

(56) References Cited

U.S. PATENT DOCUMENTS

| 2014/0241354 A1* | 8/2014 | Shuman | H04L 12/2803 |
| | | | 370/390 |
| 2015/0067154 A1* | 3/2015 | Ly | H04L 67/125 |
| | | | 709/224 |

(Continued)

FOREIGN PATENT DOCUMENTS

WO WO-2018208337 A1 11/2018

OTHER PUBLICATIONS

"OCF Security Specification V1.0.0", Open Connectivity Foundation (OCF), [Online] Retrieved from the internet:https: openconnectivity.org draftspecs OCF_Security_Specification_vI.0.0.pdf, (Mar. 22, 2017), 104 pgs.

(Continued)

*Primary Examiner* — Kevin T Bates
*Assistant Examiner* — Emad Siddiqi
(74) *Attorney, Agent, or Firm* — Schwegman Lundberg & Woessner, P.A.

(57) ABSTRACT

Systems and techniques for defining and operating management services within a "domain" portion of an Internet of Things (IoT) network are disclosed herein. An example technique for implementing management functions of a device in a domain of the IoT network, for a device that is a defined within a hierarchy managed in the domain, may include: defining a resource structure in a secure virtual resource of the device, for a resource structure that identifies and defines at least one management service of the device; establishing properties of the at least one management service resource on the device within a resource structure, with the use of properties that are associated with a management function to be performed in the domain; and (Continued)

operating the device in the domain according to the management function. Further integration and use of management services and other management functions are also disclosed.

27 Claims, 15 Drawing Sheets

(51) Int. Cl.
    *H04L 41/50*     (2022.01)
    *H04L 67/10*     (2022.01)
    *H04L 67/12*     (2022.01)
    *H04L 41/0806*     (2022.01)
    *G16Y 40/35*     (2020.01)

(52) U.S. Cl.
    CPC .......... *H04L 41/0806* (2013.01); *H04L 41/50* (2013.01); *H04L 67/10* (2013.01); *H04L 67/12* (2013.01)

(56) References Cited

U.S. PATENT DOCUMENTS

| | | | | |
|---|---|---|---|---|
| 2015/0121470 A1* | 4/2015 | Rongo | ................. | H04L 63/083 |
| | | | | 726/4 |
| 2017/0123389 A1* | 5/2017 | Baez | ....................... | H04W 4/70 |
| 2018/0115611 A1* | 4/2018 | Lear | ....................... | H04L 41/28 |
| 2019/0334929 A1* | 10/2019 | Teshome | ............. | H04L 63/1408 |

OTHER PUBLICATIONS

"OCF Core Specfication V1.0.0 Part 1", Open Connectivity Foundation (OCF), (Mar. 22, 2017), 175 pgs.

"International Application Serial No. PCT US2018 013301, International Preliminary Report on Patentability dated Nov. 21, 2019", 7 pgs.

"International Application Serial No. PCT/US2018/013301, International Search Report dated Mar. 22, 2018", 4 pgs.

"International Application Serial No. PCT/US2018/013301, Written Opinion dated Mar. 22, 2018", 5 pgs.

"OCF Security Specification V1.0.0", Open Connectivity Foundation (OCF), [Online] Retrieved from the internet: <https://openconnectivity.org/draftspecs/OCF_Securi ty_Speci fi cati on_vl.0.0.pdf>, (Mar. 22, 2017), 104 pgs.

Meloni, Alessio, et al., "A cloud-based and RESTful Internet of Things platform to foster Smart Grid technologies integration and re-usability", IEEE International Conference on Communications Workshops ICC IEEE, (May 23, 2016), 387-392.

Misura, Kresimir, et al., "Internet of things cloud mediator platform", 37th International Convention on Information and Communication Technology Electronics and Microelectronics MIPRO MI PRO, (May 26, 2014), 1052-1056.

Yang, Yingyi, et al., "A Cloud-Based Development Platform for Services and Bundles of Internet of Thing", IEEE 11th International Conference on Dependable Autonomic and Secure Computing IEEE, (Dec. 21, 2013), 379-385.

* cited by examiner

INTERNET OF THINGS (IOT) NETWORK DOMAIN RESOURCE MODEL

PRIORITY CLAIM

This application is a U.S. National Stage Application under 35 U.S.C. 371 from International Application No. PCT/US2018/013301, filed Jan. 11, 2018, published as WO 2018/208337, which claims the benefit of priority to U.S. Application Ser. No. 62/503,806, filed May 9, 2017, all of which are incorporated herein by reference in their entirety.

TECHNICAL FIELD

Embodiments described herein generally relate to computer networks and more specifically to Cloud-hosted IoT networks with user and device sharing.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
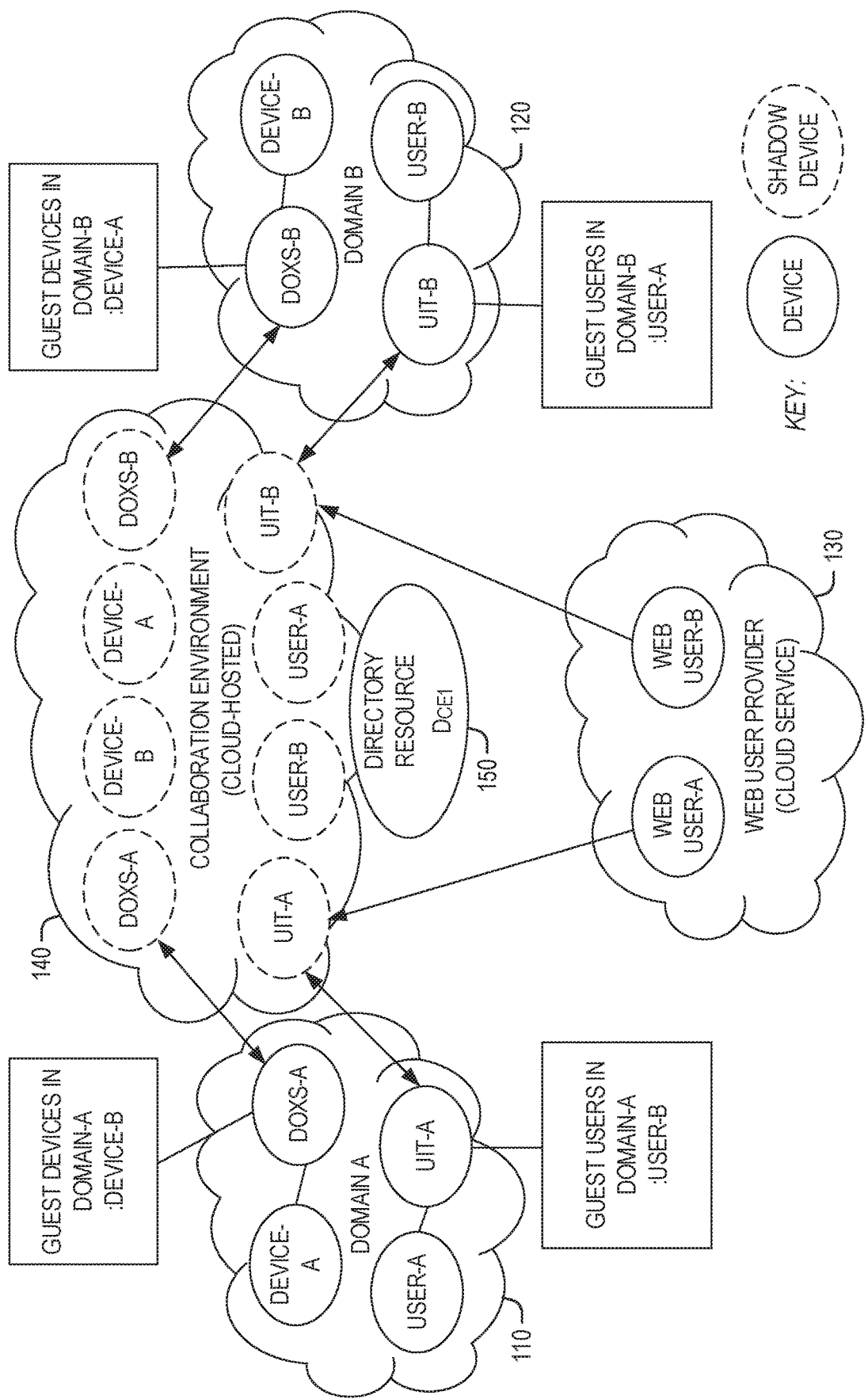
FIG. 1 is a system overview of a Collaboration Environment used to allow Web Users and IoT Domains of devices to be admitted into respective domains as members or guests of the domain, according to an embodiment.

Internet of Things (IoT) frameworks such as that proposed by the Open Connectivity Foundation (OCF)—the OCF family of standards (e.g., the OCF Specification 1.0 and thereafter)—define an object model that includes "resources" and "properties," which offer an abstract representation of devices, data, and functionality in an IoT endpoint. Often, IoT objects are hosted on simple platforms such as an embedded device, a phone, a tablet, or a personal computer/gateway device. Together, these devices form a "network", "fog," or "collection" of devices under the control of an owner/operator. However, when devices from different owners wish to collaborate, each owner must resolve how these devices should be discovered and introduced into their respective environments. Traditional IEEE 802.11 and Ethernet networks do not contemplate the possibility of device ownership, but rather simply look for the existence or non-existence of devices with an Internet Protocol (IP) address on their network. The notion of a fully vetted and credentialed 'guest' device or 'guest' user is also not presently contemplated by IoT frameworks.

A technique is described herein that defines a way to use a cloud hosting service such as Amazon Web Services (AWS) to host a "collaboration environment" (CE) that is open to devices and users of different IoT "domains." The CE provides a common platform for discovering devices owned by a peer domain or devices that are not owned at all. It also provides a common platform for web users who are known to web identity providers such as Facebook or Google to be introduced to a domain. Domains may register users with the domain making them regular users to the domain having domain privileges or they may be shared with a peer domain becoming guests of the peer domain. The CE may host 'shadow' devices that have a footprint on a physical platform within the local network. Likewise, the CE may rely on a cloud hosting service such as AWS to natively host an IoT framework application that implements the device abstraction and some or all of the devices and services defined for the IoT framework.

Existing technologies such as XMPP chat rooms implement a capability in which users interested in collaborating using instant messages are able to enter a chat room of like-minded potential collaborators. However, chat room technology is aimed at facilitating instant messaging traffic that fundamentally is driven directly by user activity. IoT frameworks typically involve headless autonomous devices that need to navigate the cloud without help from a user 'driving' the interaction. For that reason, existing chat room techniques are insufficient. IoT Frameworks and accompanying object models are designed to facilitate the needs of autonomous headless devices already, but lack the ability to be hosted by a cloud hosting service without consideration for discovery, onboarding, registration, and provisioning.

The techniques and configurations for a CE described herein enable registration of web users as IoT domain users. A domain may be embodied by a "fog", "cloud". "system", or like "network" of devices. These techniques and configurations also enable sharing of users and devices claimed by a first IoT domain with a second IoT domain. The CE itself may be hosted in the cloud (e.g., by AWS) and may have an identity and its own access requirements. This CE may also facilitate discovery and collaboration among IoT devices and users of the same or different IoT domains. By using an IoT Framework object model abstraction to represent the CE, any device that implements the IoT framework code is enabled with cloud-capable features.

The present techniques and configurations may be embodied in a system that may be viewed as the confluence of four networks where a first network is the Fog of devices making up a Domain-A Fog, a second network is a second Fog that consists of a peer domain (Domain-B), and a third network is provided by a cloud-hosted collaboration environment (CE). The fourth network, a remote cloud network (the world wide web), already hosts user communities in the form of social networking sites such as Facebook or Google+, and these sites operate servers that identify cloud users who may want to interact with IoT domains. In this scenario of multiple networks and entities, the CE enables the respective interactions ("collaborations") with the cloud and with the respective Fogs to occur.

FIG. 1 is a system overview of a Collaboration Environment (CE) 140 used to allow Web Users of a Web Provider 130 and IoT Domains (Fogs) 110, 120 of devices to be admitted into respective domains as members or guests of the domain.

The CE 140 plays a role where an IoT framework application is hosted on a cloud server such as AWS and implements a hosting environment for "shadow" devices. Such shadow devices are IoT devices that provide a front-end application to physical devices hosted inside a local network or inside yet another cloud hosting environment (e.g., AWS-A to AWS-CE).

Within the domains (domain A 110, and domain B 120), there are both administrative devices and regular devices, where administrative devices administer the operational functions of the domain. Such operational functions may include device lifecycle (adding, maintaining and removing devices, including guest devices, performed by a DOTS/DOXS service); user lifecycle (adding, maintaining and removing users, including guest users, performed by a UIP service); and the ongoing maintenance of security that may include credential management, access control management, software update management and so forth. These capabilities are implemented as part of the IoT object model abstraction so that management functions are easily integrated with other IoT functionality.

With the present techniques, any IoT device may be configured to also operate as an IoT management device to operate as a DOTS/DOXS, UIP, or a variety of other management services. In an example, establishment of a device as a management device involves the following sequence: 1) Onboard the device; 2) Register a user; 3) Create management resources on the device targeted to fulfill an administrative role: 4) Issue a credential that authorizes a user and a device to perform management functions; 5) Provision IoT script/code to perform a particular management function; and 6) Invoke the script/code.

In the context of an OCF device, it will be understood that the management function of a "network" management service or a "security" management service (e.g., DOTS/DOXS) achieves its objective by manipulating a "managed resource" hosted by an OCF Device. Such resources may be in the form of "Secure Virtual Resources", which provide managed resources on a device (e.g., resources on an OCF Server device) that are managed by a respective service (e.g., an owner service operating on an OCF Client device) such as DOTS/DOXS. Access Management Service (AMS), Credential Management Service (CMS), or the like. In a further example, unmanaged resources may be those accessed by OCF Clients or other OCF Servers but where such services are not performing a management function.

Other management services of a domain may be enlisted to provision credentials and access control policies used by other devices to respond to the new delegate device. Reversing the delegation involves reversal of the sequence of operations 1-6 above.

With this technique, a simple delegation script (e.g., code) may be used to expand or contract network management appropriately as the network grows or shrinks. No special administrative devices are required to enable management operations except to grow operational capacity.

Figure 2:
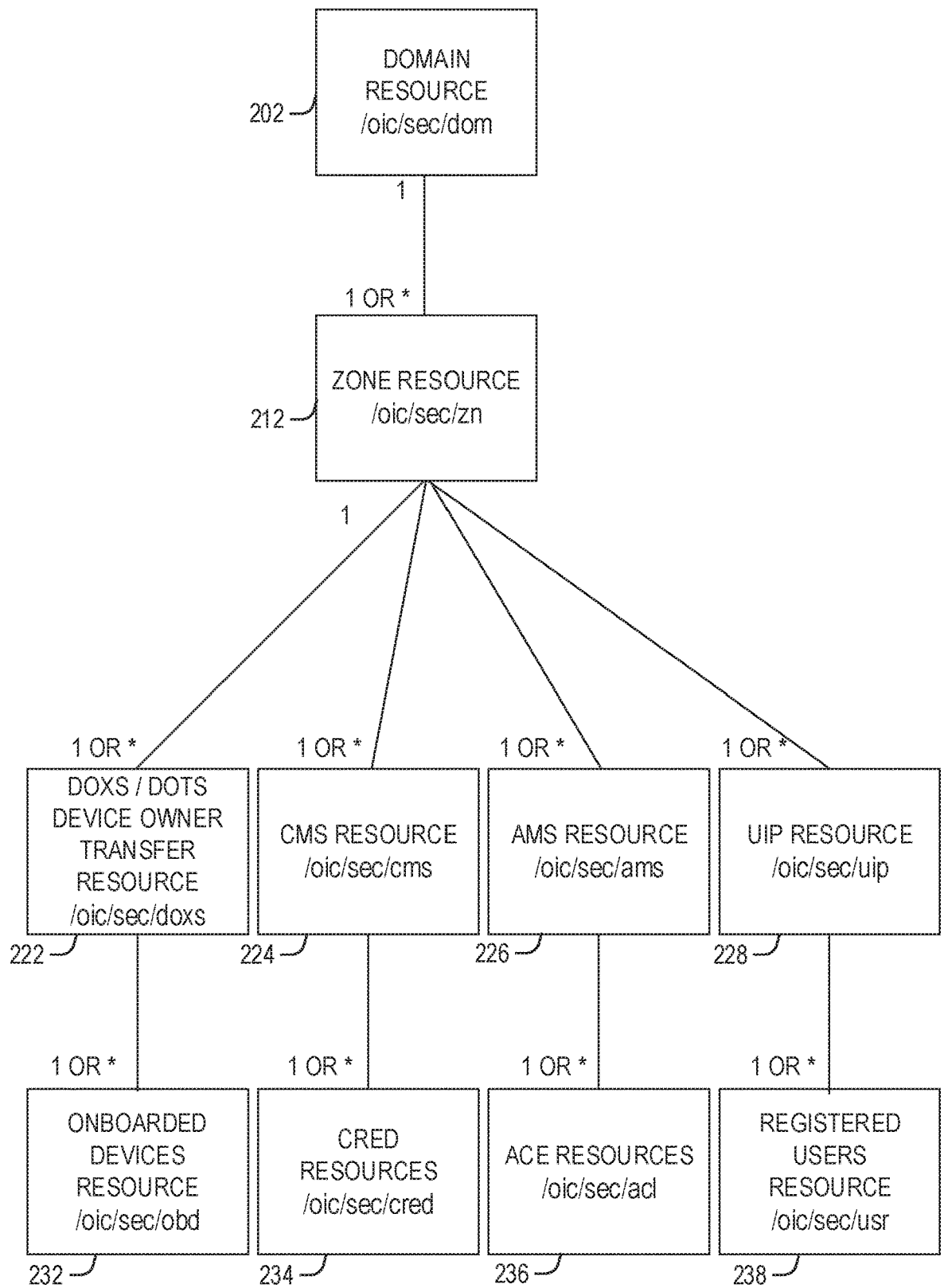
FIG. 2 is a view of an example resource structure for managing an IoT domain, according to an embodiment.

In a more detailed example, the present techniques are provided from use of an object model that relates several of the preceding concepts. FIG. 2 is a view of an example resource structure for managing an IoT "domain." according to an embodiment. In an example, a resource structure is isomorphic to a deployment architecture where each service and its respective resources are hosted by different platforms. In another example, such services and resources may be hosted by a single platform.

As shown in FIG. 2, an object model between the concepts may indicate a relationship model for resources including:

(a) Domain 202—An environment that claims several devices, users and/or zones as its members.

(b) Zones 212—An environment that subdivides the domain by partitioning and assigning management services for performing device and user lifecycle and security management operations.

(c) DOXS (or DOTS)—A Device Onboarding service (associated with a device owner transfer resource 222, and an onboarded device resource 232).

(d) CMS—A credential management service (associated with a CMS resource 224, and one or more CRED resources 234).

(e) AMS 226—An access management service (associated with an AMS resource 226, and one or more ACE resources 236).

(f) UIP 228—A user identity registration service (associated with an UIP resource 228, and one or more registered user resources 238).

Other resources and services such as a BSS software update management service, among others, may also be included.

A service (e.g., each service) maintains a set of resources that identifies the objects manipulated in the course of fulfilling its respective role. A directory resource (e.g., directory resource 150 coupled to the CE 140 shown in FIG. 1) may be used to maintain a collection of resource references to all resources used in the administration of the domain or collaboration environment.

This resource model may be utilized in various domains and zones that are connected to each other through a CE. In an example, a first collaboration environment (CE1) may be used for discovery among peer domains where a domain controller is authorized to participate in CE1 by its local authority. However, the CE1 may not have a constraint in terms of who may participate. This allows ad hoc meetings among mutually suspicious entities. The ad hoc nature allows new trust relationships to be formed without the need of a central trusted third party/introducer (which parallels the way organic trust bonds are formed in the physical world).

There may be multiple ECs (EC2-ECN) where the set of devices and users permitted to become members of the EC is jointly controlled by a respective domain controller (DC) of a "home" or current domain. As part of DC authorization to join an EC (e.g. EC7) the respective DC (e.g. DC_A and DC_B) issue credentials authorization for participation in the EC7. Each issues a credential to their respective participants. For example, the credential could be a certificate signed by the DC_A for Domain-A devices and users and DC_B for Domain-B devices and users respectively. When a peer device/user interacts with a device/user of an opposite peer domain, the DC_A obtains a trust anchor from DC_B that is provisioned into the Domain_A devices (and vice versa for Domain_B). This enables all EC7 devices the ability to authenticate the other EC7 devices. This approach enables multiple peer domains to form and manage the security of an EC where there isn't a central EC authority defined.

A domain may chose to opt-out of the EC by revoking credentials and trust anchors supplied to its own domain's devices and users. Further, if a Domain_A device is known to have been compromised, the DC_A may nevertheless notify DC_B of the compromise and enable it to determine whether or not to revoke the Domain_A device.

Figure 3:
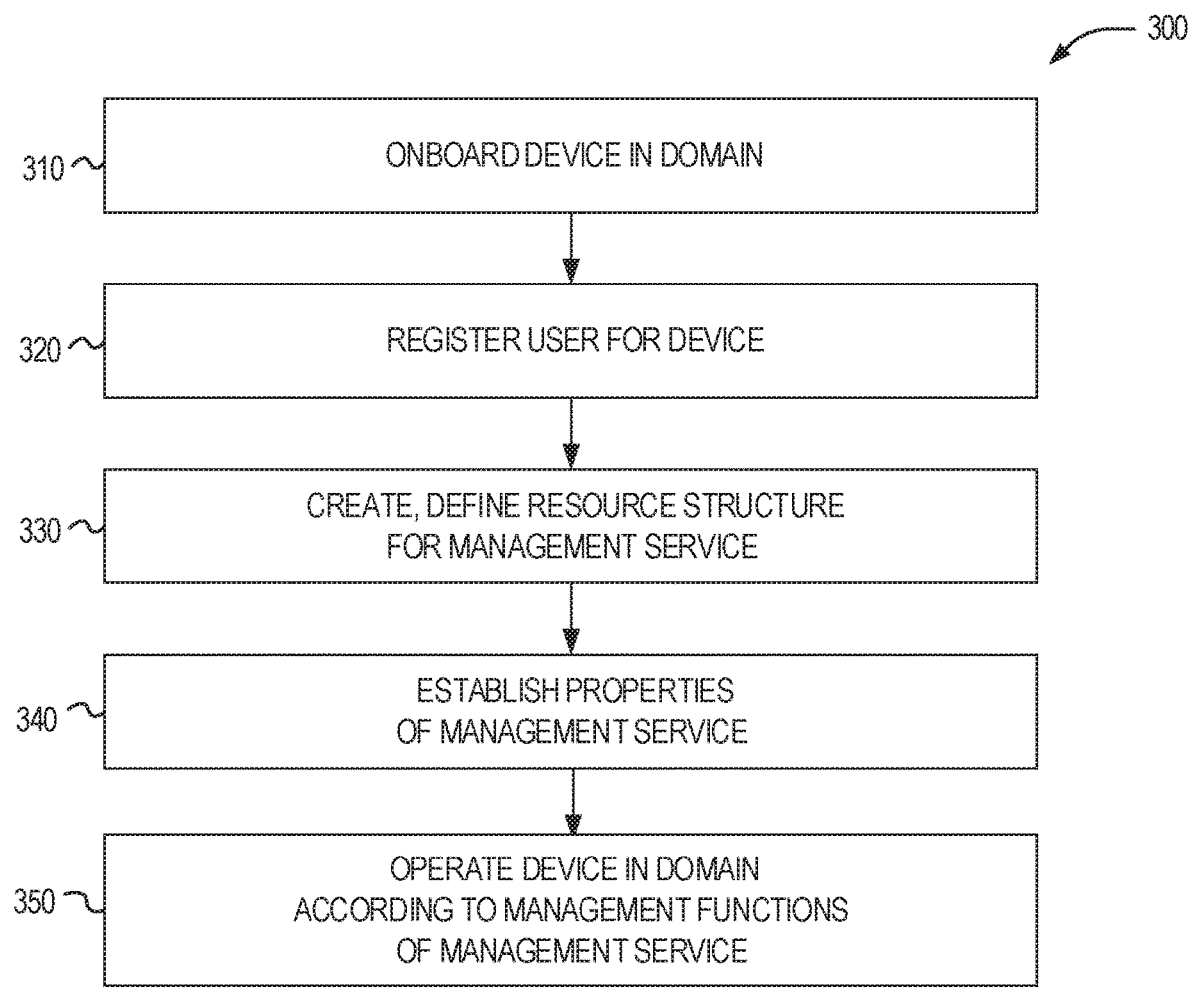
FIG. 3 is a flowchart of an example technique performed by a server device for managing functions of the device in a domain of the IoT network, according to an embodiment.

FIG. 3 illustrates a flowchart 300 of an example technique performed by an IoT server device for managing functions of the device in a domain of the IoT network. The following operations are depicted from the perspective of an IoT device or system to be configured as a management service in an IoT network topology. However, it will be understood that the techniques and operations of flowchart 300 may be further adapted from either client or server side perspectives, or systems involving both client, server, and intermediate entities.

The flowchart 300 begins with operations to configure the device for operation in the domain, such as onboarding the device in a domain (operation 310), and registering a user for the device (operation 320). In an example, this onboarding and registering is a one-time precondition for establishing the operational state of the device to begin operation of one or more management functions. Further operations, such as obtaining credentials to authorize the user and the device to perform the management function in connection with at least one management service (not shown), may also be performed.

The flowchart 300 continues with a series of operations that create and define a resource structure for a management service (operation 330), establish properties of the management service (operation 340), and operate the device in the domain according to various management functions of the management service (operation 350). In an example, operations to define the resource structure, occur with a secure virtual resource of the device, such that the resource structure is defined to identify at least one management service of the device. For instance, the resource structure may define at least one management service resource that corresponds to the at least one management service, and the at least one management service resource may be defined in a hierarchy under a domain resource (e.g., as is depicted in FIG. 2). Also in an example, operations to establish properties of the at least one management service resource are performed on the device within the resource structure, such that the properties are associated with a management function to be performed in the domain. Also in an example, operating the device according to the various management functions includes provisioning code on the device to perform the management function, and invoking (e.g., executing) the code on the device to perform the management function.

In an example, the management function is controlled by a management service operating within the domain, and the domain resource is controlled by a domain management service operating within the domain. In a further example, the management service directly operates on the device, while the domain management service operates on another device in the domain.

In an example, the at least one management service includes at least one of: a device onboarding service, an access management service, a credential management service, or a software update management service. Also in an example, the at least one management service includes an onboarding tool service (e.g., OBT+ management services such as DOTS/DOXS), such that the onboarding tool service is operated by the device in the domain in response to deployment of the device as a first device in the domain. Also in an example, the device operates the management function in response to an onboarding tool delegation, a zone controller delegation, or a domain controller delegation. In a further example, the at least one management service resource is further defined under a zone resource, such that the zone resource is defined under the domain resource, and such that a respective zone defined by the zone resource includes a plurality of devices in the domain that operate according to common service characteristics. Thus, in scenarios including use of a zone, the domain includes at least one zone including the respective zone.

In still further examples involving the management function performing at least one onboarding tool service function, management operations may include the device requesting onboarding tool service privileges from a domain controller indicated in the domain resource. In response to receiving the onboarding tool service privileges from the domain controller, the device may perform the management function. Additionally, in further examples, in response to receiving a zone controller delegation from a domain controller, the management function performed by the device may include at least one zone controller service function.

As discussed above, the preceding techniques may involve the use of OCF specification-based operations. For instance, communications in the IoT network to perform and initiate the management operations and functions may be conducted according to one or more OCF) specifications, such that one or more of the communications comprise Representational State Transfer (RESTful) interactions among one or more IoT network topologies. In an OCF model, the notion of the client and server is realized through roles, where any Device may act as a Client and initiate a RESTful operation on any Device acting as a Server. Likewise, any Device that exposes Entities as Resources may act as a Server. Each RESTful operation contains all the information necessary to understand the context of the interaction and may be deployed using a small set of generic operations (e.g., CREATE. RETRIEVE, UPDATE. DELETE and NOTIFY (CRUDN)). Thus, the techniques and scenarios discussed above for management functions may be operated with use of this Device-Server RESTful interaction model.

The following discussion (including the tables below, and the text corresponding to FIGS. 4 to 10) provides a number of specific examples or implementations describing resources and processes for managing domain and zone resources, for use within a domain, among multiple domains, or within a collaboration environment.

Onboarding Use Case.

The approaches discussed in the following scenarios proposes defining resources hosted by an onboarding device that maintains a list of onboarded devices. The onboarding device is recognized by the oic.sec.svc.doxs service type that may be delegated using a certificate and discovered by new 'to-be-onboarded' devices. In this scenario, Devices are onboarded into a 'domain' that has a self-asserted domain ID. A domain may operate in isolation indefinitely, hence should not be required to register or reserve its domain identity a priori—because doing so would necessitate agreement on a central naming and issuing authority that may become a central point of failure and control.

The following discussion of this onboarding use case involves definition of the Onboarding Tool (OBT) device resource model (e.g., for an OBT device that operates a DOTS/DOXS service). As used herein, an "OBT" is an OCF Client Device that implements some or all of the management services defined herein and may implement additional user interface, Model-View-Controller (MVC), user privileges or application isolation functionality not contained in the management services. Additionally, an OBT may also refer to management services that are co-resident with an OBT client application.

With the following scenarios, a hierarchical domain model that supports network partitioning may be used to enable better network scalability and onboarding context with an OBT device.

Onboarding Scenario 1: Onboarding the first OBT device. The first device deployed into a domain may assert itself as the OBT/domain controller (DC) for the domain. This is accomplished when the device is in a Ready For Onboarding Transferring Method (RFOTM) state. A device specific configuration setting determines this behavior.

Onboarding Scenario 2: Single OBT in a single domain. This is a common use case, but existing approaches do not define the "OBT device" or a "domain". In this context the OBT and DC are synonymous.

Onboarding Scenario 3: Multiple peer OBTs in the same domain. Multiple peer OBTs may operate independently to onboard devices. These OBTs may use the OCF framework to maintain a common understanding of what devices are members of the domain.

Onboarding Scenario 4: Cloud-based OBT. A cloud service hosts a single OBT where the owner transfer method (OTM) establishes a secure path between the new device and the cloud-hosted OBT device. In this context the OBT and DC are synonymous.

Domain Management Resources.

In an example, the resource model supporting device onboarding may be defined to identify resources including: (1) A device having a domain resource that references, (2) One or more devices hosting a zone resource that references, (3) One or more devices hosting CMS services, (4) And one or more devices hosting AMS services. (5) And one or more devices hosting DOTS/DOXS services (onboarding) that references, and (6) One or more member devices. Each resource may be hosted on a single device or flexibly spread across multiple devices depending on deployment topology requirements.

The goal of onboarding is to establish trust in the new device and configure the device for ongoing device management within the domain that onboarded it. A device that has previously been onboarded will not entertain subsequent ownership transfer method requests without first returning to the RESET state.

Onboarding begins when an OBT device (which is a device authorized to perform onboarding into a particular domain) discovers a new device that doesn't currently have an owner. The new device may proactively request onboarding services if an onboarding service is discoverable by the new device.

The new device and onboarding device negotiate an appropriate owner transfer method (OTM) through examination of the/oic/sec/doxm resource supported OTMs (oxms) property. The onboarding device may supply its list of supported transfer methods via the (oxmp) property. The onboarding device is expected to select the strongest supported method by the new device.

At the end of ownership transfer, the following has been accomplished: (a) Trust is established between the new device and the onboarding device in the context of a secure session; (b) A device identifier is associated with the new device; (c) The new device identifier isn't previously assigned to a different device; (d) The device knows the domain, zone and device that onboarded it: (e) The new device has at least one credential that may be used to authenticate a device authorized to re-onboard the device; (f) The new device may have credentials that may be used to authenticate device management services; (g) The device state is allowed to be controlled by the new domain.

Support Services.

In an example, the resources that define the "OBT device" and other services supporting OCF devices may be expanded to host other supporting services. Support service resources may be hosted by the same device (e.g., OBT) or may be hosted by other devices—such as domain resources that may be hosted by a domain controller device, zone resources hosted by a zone controller device, and doxs resource hosted by an on-boarding device, and the like. There may be multiple instances of support services devices that should synchronize the onboarded devices resource—/oic/sec/obd. For example, peer onboarding devices could use CoAP GET(obs) on the peer's /oic/scc/obd resources.

The following paragraphs and tables provide examples of the various resources that may be defined to implement the presently disclosed resource model. It will be understood that variations to names, titles, and identifiers may occur.

Domain Resource Definition.

The following table provides an example of a domain resource definition.

TABLE 1

| Fixed URI | Resource Type Title | Resource Type ID ("rt" value) | Interfaces | Description | Related Functional Interaction |
|---|---|---|---|---|---|
| /oic/sec/dom | domain resource | oic.r.dom | baseline, rw, ll | Subdomain list | |

Domain Resource Properties.

The properties of the domain resource consist of a domain identifier (domid) and link(s) to zone resource(s). Table 2 provides a definition of the device id and zone links properties.

TABLE 2

| Property Name | Value Type | Value Rule | Access Mode | Mandatory | Description |
|---|---|---|---|---|---|
| did | UUID | string | RW | Y | Domain identifier |

The domain controller may delegate service provider roles by issuing credentials containing the appropriate service type roles. (See Table 23).

Zone Resource Definition.

In an example, the zone resource is hosted by a device delegated to be a zone controller. Zone controller devices may perform domain actions of assigning bootstrap, onboarding, credential management and access management services to member devices and maintaining a list of devices onboarded into the domain and zone. The following table provides an example of a zone resource definition.

TABLE 3

| Fixed URI | Resource Type Title | Resource Type ID ("rt" value) | Interfaces | Description | Related Functional Interaction |
|---|---|---|---|---|---|
| /oic/sec/zn | subdomain resource | oic.r.zn | baseline, rw | Resource managing the sub-domain | |

Zone Resource Properties.

The properties of the zone resource consist of a zone (subdomain) identifier (zid) and the services implemented by the device hosting the zone resource. The following table provides an example definition of the Zone ID property.

TABLE 4

| Property Name | Value Type | Value Rule | Access Mode | Mandatory | Description |
|---|---|---|---|---|---|
| zid | UUID | UUID | RW | Y | Subdomain identifier |

Zone List Resource Definition.

The following table provides an example of a zone list resource definition.

TABLE 5

| Fixed URI | Resource Type Title | Resource Type ID ("rt" value) | Interfaces | Description | Related Functional Interaction |
|---|---|---|---|---|---|
| /oic/sec/zones | Collection of devices that functions as zone controller | oic.r.zones | baseline, rw, ll | List of oic-links to zone controllers | |

Zone List Resource Properties.

The following table provides an example definition of the properties of the zones links property resource.

TABLE 6

| Property Name | Value Type | Value Rule | Access Mode | Mandatory | Description |
|---|---|---|---|---|---|
| links | oic-link (where "rt" = oic.r.zn) | array of oic-link | RW | Y | Links to zone controller resources |

Onboarding Device List (obts) Resource Definition.

The following table provides an example of an obts resource definition.

TABLE 7

| Fixed URI | Resource Type Title | Resource Type ID ("rt" value) | Interfaces | Description | Related Functional Interaction |
|---|---|---|---|---|---|
| /oic/sec/obthosts | Collection of devices that may perform onboarding in this domain or zone | oic.r.obthosts | baseline, rw, ll | List of oic-links to doxs providers | |

Onboarding Device List Resource Properties.

The following table provides an example of the properties of the obts links resource.

TABLE 8

| Property Name | Value Type | Value Rule | Access Mode | Mandatory | Description |
|---|---|---|---|---|---|
| links | oic-link (where "rt" = oic.r.doxs) | array of oic-link | RW | Y | Link to the onboarding device(s) that are associated with a domain or zone. |

CMS Device List Resource.

The following table provides an example of a CMS device list resource definition.

TABLE 9

| Fixed URI | Resource Type Title | Resource Type ID ("rt" value) | Interfaces | Description | Related Functional Interaction |
|---|---|---|---|---|---|
| /oic/sec/cmshostss | Collection of devices that may perform credential management for this domain or zone | oic.r.cmshosts | baseline, rw, ll | List of oic-links to CMS providers | |

CMS Device List Resource Properties.

The following table provides an example of the properties of the CMS Device List Resource.

TABLE 10

| Property Name | Value Type | Value Rule | Access Mode | Mandatory | Description |
|---|---|---|---|---|---|
| links | oic-link (where "rt" = oic.r.cms) | array of oic-link | RW | Y | Link to the credential management device(s) that are associated with this zone. |

AMS Device List Resource.

The following table provides an example of an AMS device list resource definition.

TABLE 11

| Fixed URI | Resource Type Title | Resource Type ID ("rt" value) | Interfaces | Description | Related Functional Interaction |
|---|---|---|---|---|---|
| /oic/sec/amshosts | Collection of devices that may perform access management for this domain or zone | oic.r.amshosts | baseline, rw, ll | List of oic-links to AMS providers | |

AMS Device List Resource Properties.

The following table provides an example of the properties of the Access Management Services List Resource.

TABLE 12

| Property Name | Value Type | Value Rule | Access Mode | Mandatory | Description |
|---|---|---|---|---|---|
| links | oic-link (where "rt" = oic.r.ams) | array of oic-link | RW | Y | Link to the access management device(s) that are associated with this zone. |

BSS Device List Resource.

The following table provides an example definition of a BSS device list resource.

TABLE 13

| Fixed URI | Resource Type Title | Resource Type ID ("rt" value) | Interfaces | Description | Related Functional Interaction |
|---|---|---|---|---|---|
| /oic/sec/bsshosts | Collection of devices that may perform bootstrap management for this domain or zone | oic.r.bsshosts | baseline, rw, ll | List of oic-links to BSS providers | |

BSS Device List Resource Properties.

The following table provides an example of the properties of the BSS Device List Resource.

TABLE 14

| Property Name | Value Type | Value Rule | Access Mode | Mandatory | Description |
|---|---|---|---|---|---|
| links | oic-link (where "rt" = oic.r.bss) | array of oic-link | RW | Y | Link to the access management device(s) that are associated with this zone. |

Onboarding Device Resource.

The onboarding device performs the domain side of the owner transfer method as part of the onboarding protocols. It maintains a list of devices that were onboarded. The following table provides a definition of the onboarding device resource.

TABLE 15

| Fixed URI | Resource Type Title | Resource Type ID ("rt" value) | Interfaces | Description | Related Functional Interaction |
|---|---|---|---|---|---|
| /oic/sec/doxs | Onboarding resource | oic.r.doxs | baseline, rw | Resource managing onboarding | Single instance |

Onboarding Device Resource Properties.

The onboarding device resource specifies the onboarding methods supported and maintains a list of device specific attributes for each onboarding device. The following table provides an example of the properties of the Onboarding Device Resource.

TABLE 16

| Property Name | Value Type | Value Rule | Access Mode | Mandatory | Description |
|---|---|---|---|---|---|
| oxmp | [oic.sec.oxm.doxmtype] | array | RW | Y | The set of owner transfer methods implemented by the OBT for provisioning new devices. |
| links | rt = oic.r.obd | array of oic-link | RW | Y | List of links to oic.r.obd resources. |

Onboarded Devices Resource.

The following table provides a definition of an onboarded devices resource.

TABLE 17

| Fixed URI | Resource Type Title | Resource Type ID ("rt" value) | Inter-faces | Descrip-tion | Related Func-tional Interac-tion |
|---|---|---|---|---|---|
| /oic/sec/obd | Onboarded devices resource | oic.r.obd | baseline, rw | Resource containing onboarded device context | |

Onboarded Devices (/oic/sec/obd) Resource Properties.

The resource identifies properties of each onboarded device. This resource contains information used by the domain to establish trust in the platform. The following table provides an example definition of the properties of the onboarded devices resource.

TABLE 18

| Property Name | Value Type | Value Rule | Access Mode | Manda-tory | Description |
|---|---|---|---|---|---|
| di | String | UUID | n/a | Y | Identifies the device onboarded by this onboarding device. |
| pi | String | UUID | n/a | Y | Identifies the platform hosting the device - used to query/p |
| oxmsel | oic.sec.doxm.type | oic.sec.oxmtype | | N | The onboarding method used to onboard the device |
| tee | oic.sec.ai.tee.type | oic.sec.ai.tee.<type> | | N | Enumerates the trusted execution technology used to harden keys/encryption |
| aiblob | octet string | octet string | | N | Blob containing additional attestation information differentiated using 'tee' to decipher blob serialization method. |

CMS Device Resource.

The following table provides an example definition of the credential management service (CMS) provider resource.

TABLE 19

| Fixed URI | Resource Type Title | Resource Type ID ("rt" value) | Inter-faces | Descrip-tion | Related Func-tional Interac-tion |
|---|---|---|---|---|---|
| /oic/sec/cms | Credential management service provider resource | oic.r.cms | baseline, rw | Resource managing credentials | Single instance |

CMS Device Resource Properties.

In an example, the CMS Device Resource specifies the supported credential refresh methods and supported credential types. The following table provides an example list of properties of the CMS device resource.

TABLE 20

| Property Name | Value Type | Value Rule | Access Mode | Manda-tory | Description |
|---|---|---|---|---|---|
| crmp | [oic.sec.crm.type] | array | RW | Y | List of credential refresh methods it implements for provisioning. |
| sctp | oic.sec.credtype | bitar-ray | RW | Y | Supported credential types for provisioning. |

AMS Device Resource.

The following table provides an example definition of the access management service (AMS) provider resource.

TABLE 21

| Fixed URI | Resource Type Title | Resource Type ID ("rt" value) | Inter-faces | Descrip-tion | Related Func-tional Interac-tion |
|---|---|---|---|---|---|
| /oic/sec/ams | AMS resource | oic.r.ams | baseline, rw | Resource managing access | |

Properties of the AMS Device Resource.

This resource specifies the access management methods supported. The following table provides an example list of properties of the AMS device resource.

TABLE 22

| Property Name | Value Type | Value Rule | Access Mode | Mandatory | Description |
|---|---|---|---|---|---|
| sacep | oic.sec.ace.type | bitarray | RW | Y | Supported access control types for provisioning. (e.g. bitarray: SBACE(1), RBACE(2), AMACL(4), SACL(8)) |

Onboarding Role Delegation.

The /cred resource must contain credentials authorizing the support service to function as such. The table below provides a definition of the role names corresponding to a support service type, as the table identifies the role names and service function authorized by it. Owned devices will verify the role authorization exists before allowing access.

TABLE 23

| Service Resource Name | Role Name |
|---|---|
| oic.r.dom | oic.sec.svc.dmc |
| oic.r.zn | oic.sec.svc.znc |
| oic.r.doxs | oic.sec.svc.doxs |
| oic.r.cms | oic.sec.svc.cms |
| oic.r.ams | oic.sec.svc.ams |
| all of the above | oic.sec.svc.* |

In an example, if the onboarding device functions as a domain controller it shall be issued a credential that is assigned the domain controller role. If the onboarding device functions as a zone controller it shall be issued a credential that is assigned the zone controller role.

In an example, the onboarding device shall be issued a credential that delegates onboarding authority. A device acting as a CMS shall be issued a credential that delegates CMS authority. A device acting as a AMS shall be issued a credential that delegates AMS authority.

Doxm Resource Definition.

The following table provides a definition of the doxm resource.

TABLE 24

| Fixed URI | Resource Type Title | Resource Type ID ("rt" value) | Interfaces | Description | Related Functional Interaction |
|---|---|---|---|---|---|
| /oic/sec/doxm | <no change> | <no change> | baseline, ll | <no change> | <no change> |

Doxm Resource Properties.

The /oic/r/doxm resource saves the deviceid of the onboarding tool in the DevOwner property. It enables the new device to subsequently recognize the doxs device that onboarded it. The device should be configured to know its domain and zone as well. Note: The device may query its domain and zone controllers to obtain these values dynamically using /oic/sec/svc entries. The doxm resource maintains a local copy that avoids network access overhead. The following table provides an example list of properties of the doxm resource.

TABLE 25

| Property Name | Value Type | Value Rule | Access Mode | Mandatory | Description |
|---|---|---|---|---|---|
| did | UUID | UUID | RW | Y | Identifies the domain to which this device belongs. |
| zid | UUID | UUID | RW | Y | Identifies the zone to which this device belongs. |

The did and zid properties are set during RFOTM device state and read-only in SRESET, RFPRO and RFNOP devices states. They are reset to 0 in RESET.

Resource Owner Property.

Given a definition of security and device management resources, the secure virtual resource (SVR) rowner property may be more directly specified as a link (oic-link) structure that references the devices hosting these resources. Consequently, the SVR rowner and rowneruuid values should be updated to be oic-link structures that point to the respective devices and resources using the oic-link hrefs.

SVR Rowner Property Updates.

Each Secure Virtual Resource (SVR) containing the rowner or rowneruuid property may be updated as follows. The following table provides a definition of the resource owner property. In an example, the rowner property is an array of oic-link structures where one or more links refer to the device and resource responsible for managing the given resource; this property replaces existing rowneruuid references.

TABLE 26

| Property Title | Property Name | Value Type | Value Rule | Unit | Access Mode | Mandatory | Description |
|---|---|---|---|---|---|---|---|
| Resource Owner Id | rowneruuid | oic.types-schema/definitions/uuid | uuid | — | RW | Yes | A uuid that identifies the device that is the owner of this resource |
| Resource Owner | rowner | oic-link | array | — | RW | Yes | The resource owners are devices |

TABLE 26-continued

| Property Title | Property Name | Value Type | Value Rule | Unit | Access Mode | Mandatory | Description |
|---|---|---|---|---|---|---|---|
| | | | | | | | management services (devices and resources) that have permission to manage this resource throughout the various device states. |

Onboarding Sequences.

The presently disclosed resources, techniques, and other configurations may enable use of a variety of onboarding sequences in an IoT network topology. In an example, the resource model described herein may extend to an onboarding sequence for a first onboarding tool (OBT).

Figure 4A:
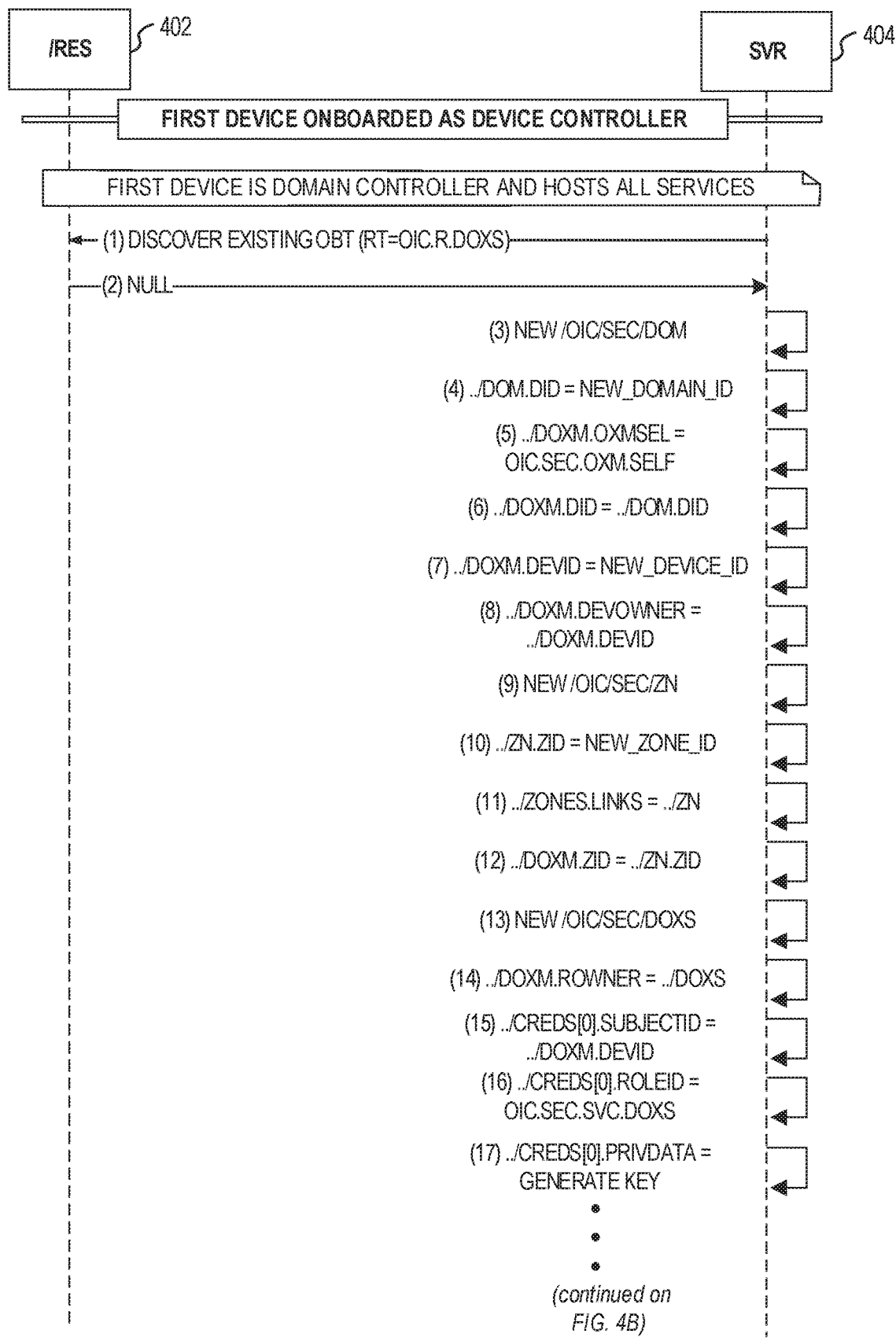
FIGS. 4A and 4B illustrate a message flow for onboarding a first device in a domain-based network configuration, according to an embodiment.
Figure 4B:
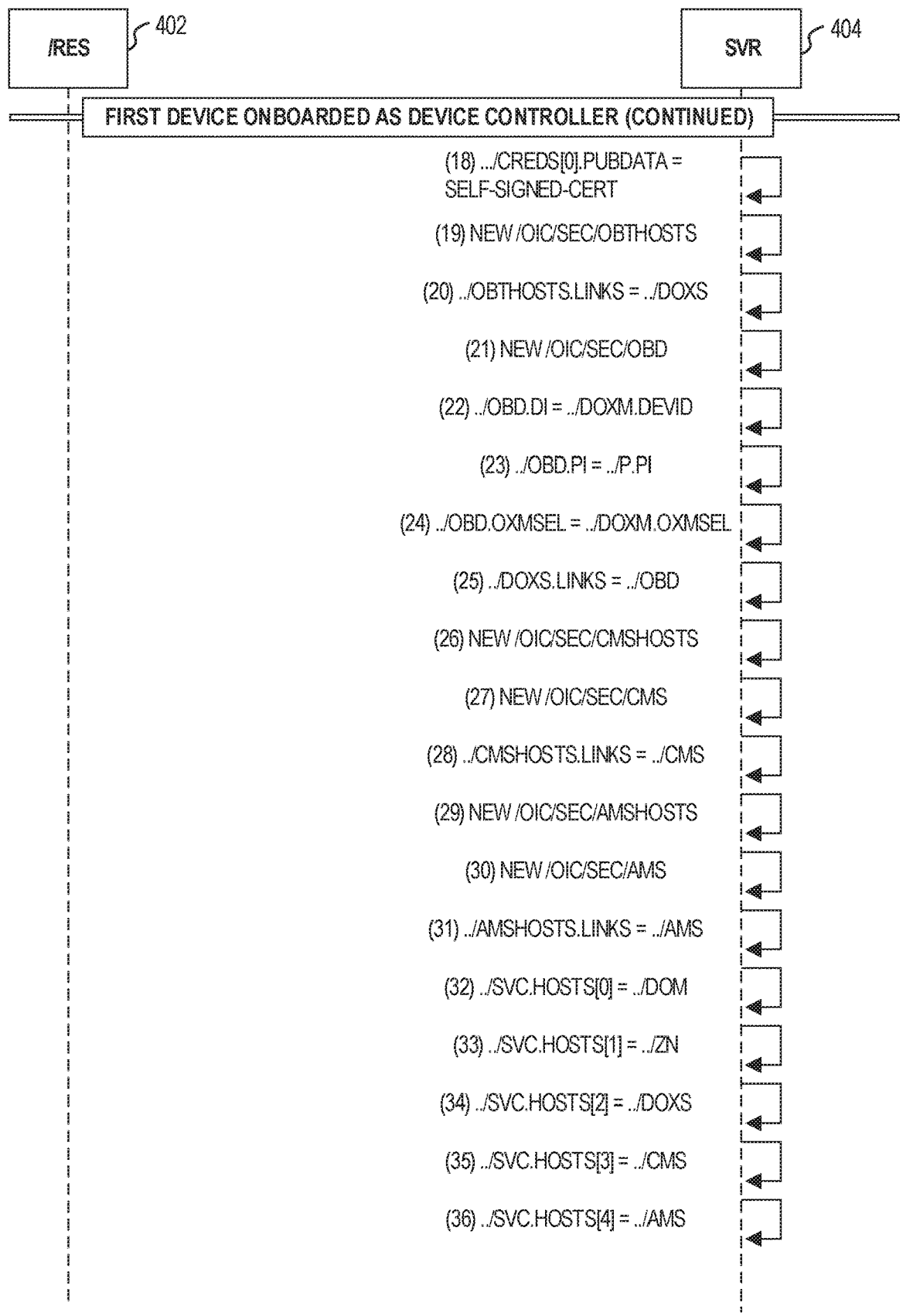

FIGS. 4A to 4B illustrate example operations for onboarding a first device, including configuring an SVR 404 of a device for device onboarding in response to an empty resource definition 402. As shown, this example illustrates the very first device deployment scenario into a previously non-existent domain. The device self-asserts domain controller rights including naming.

Figure 5:
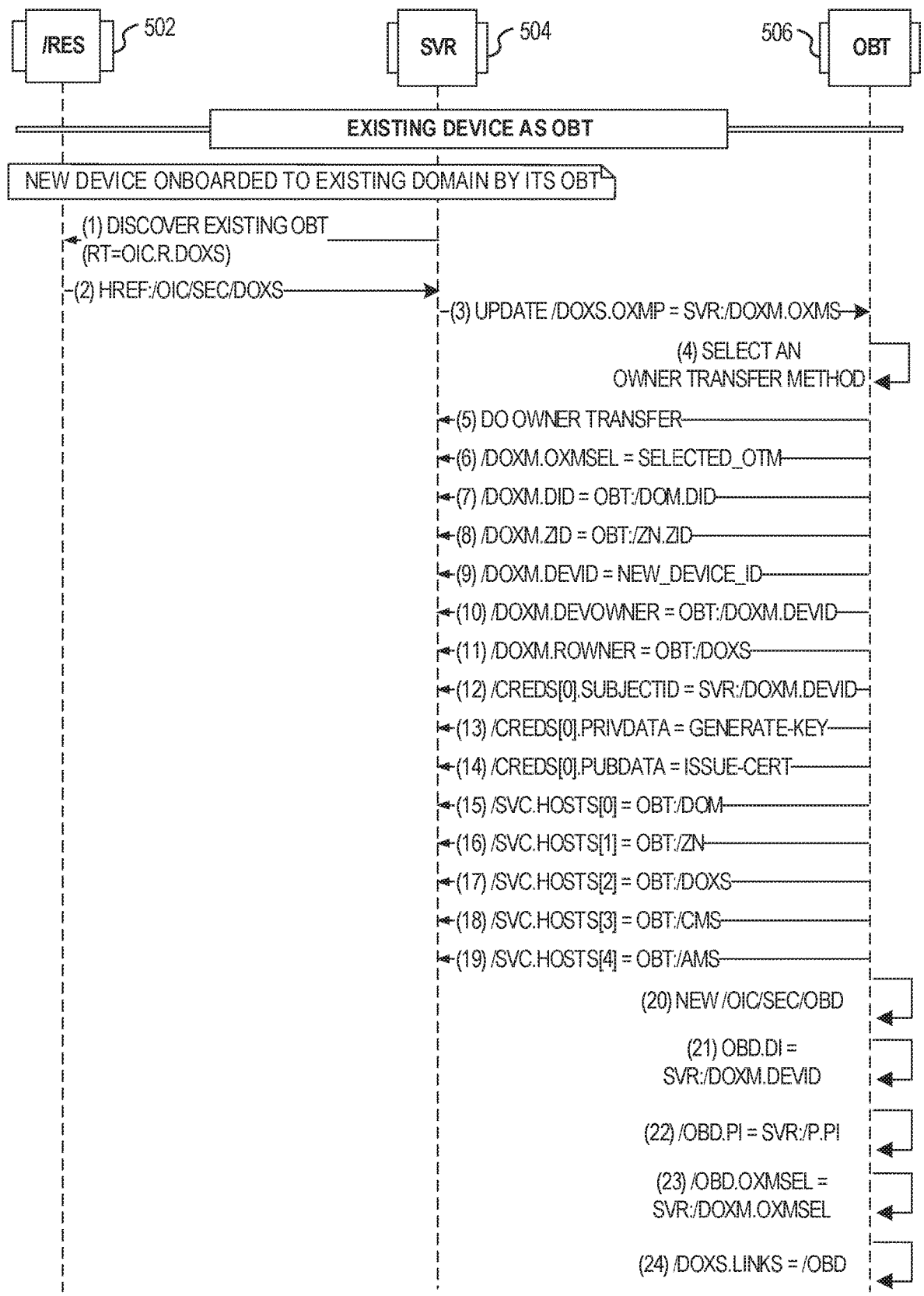
FIG. 5 illustrates a message flow for a new device onboarded to an existing domain in a domain-based network configuration, according to an embodiment.

In an example, the resource model described herein may extend to an onboarding sequence for a single OBT, in a single domain. FIG. 5 illustrates example operations for a new device being onboarded to an Existing Domain, including configuring an SVR 504 of a device based on a DOTS/DOXS reference indicated in a resource definition 502. As shown, this example shows a new device being onboarded into a domain, through use of OBT 506, as the device is configured for normal operation within the domain. The new device proactively finds and contacts a suitable onboarding device (the OBT 506).

Figure 6:
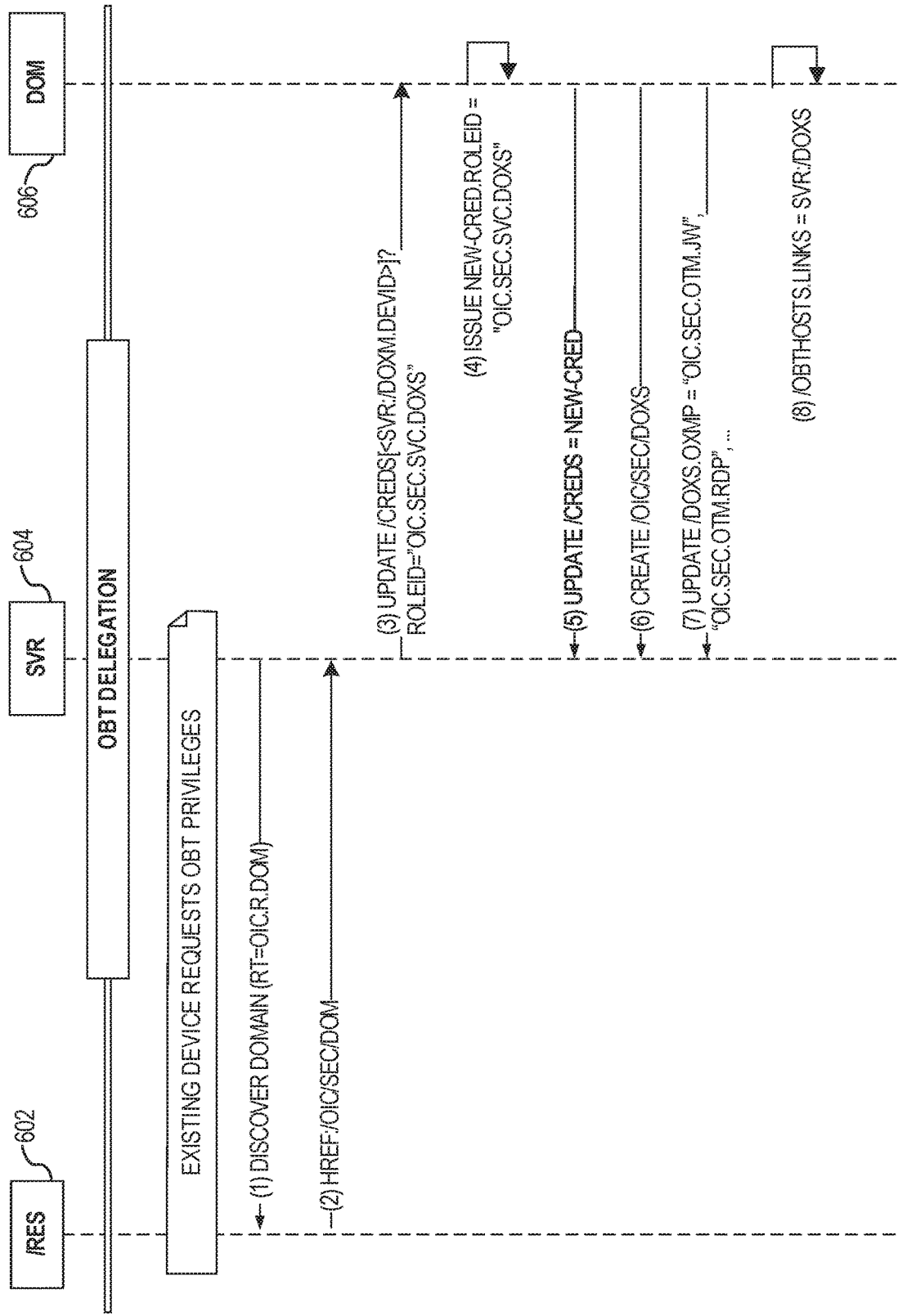
FIG. 6 illustrates a message flow for an existing device receiving OBT delegation in a domain-based network configuration, according to an embodiment.

In an example, the resource model described herein may extend to provide an OBT Delegation. FIG. 6 illustrates example operations for an existing device to receive OBT delegation, including configuring an SVR 604 of a device based on a DOM (domain) reference indicated in a resource definition 602. As shown, this example illustrates an existing device that requests to become an onboarding device, as the device obtains credentials and information from the DOM domain controller 606.

Figure 7:
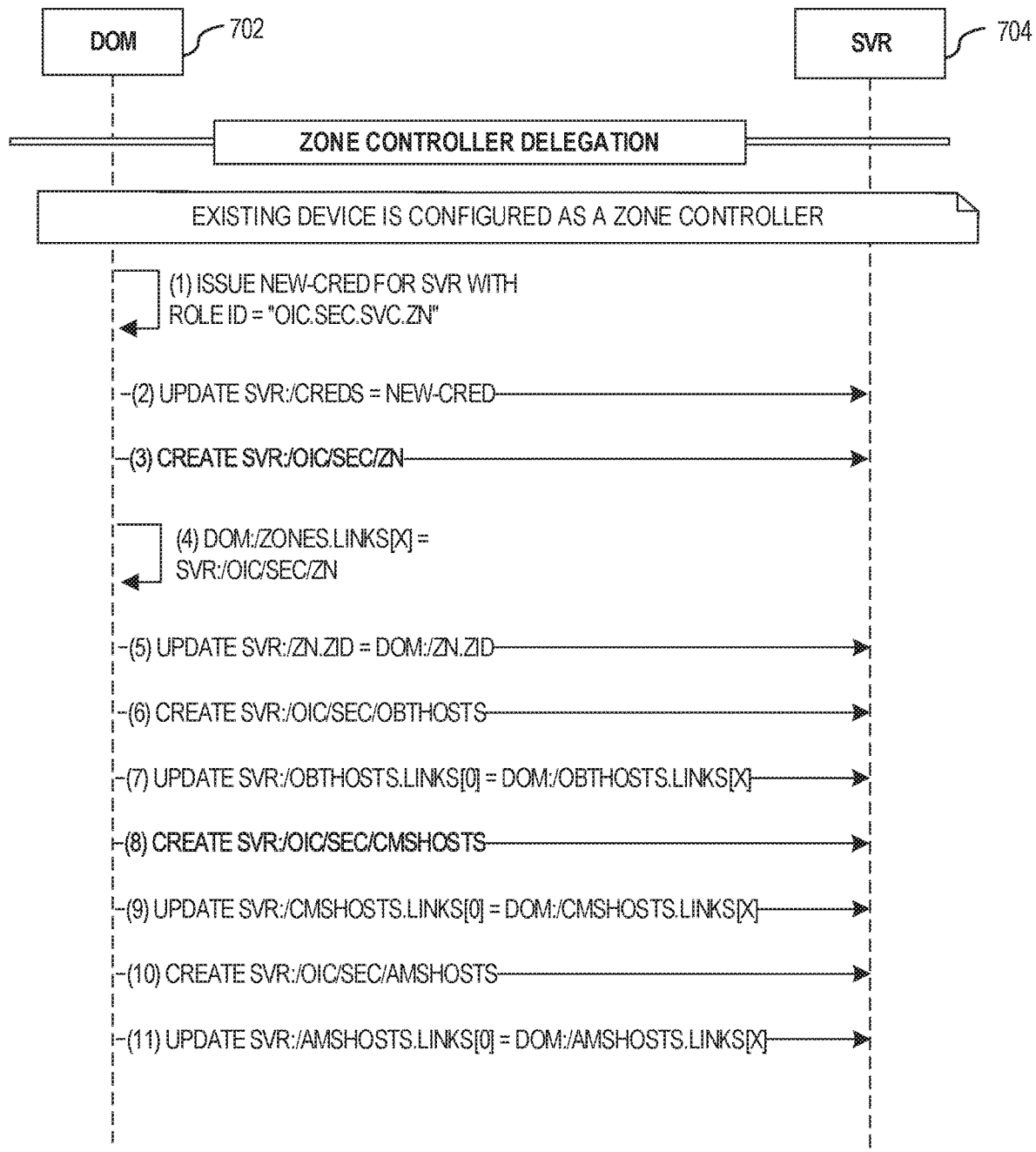
FIG. 7 illustrates a message flow for an existing device receiving Zone Controller delegation in a domain-based network configuration, according to an embodiment.

In an example, the resource model described herein may extend to enable a Zone Controller Delegation. FIG. 7 illustrates example operations for an existing device to receive Zone Controller delegation, including configuring the SVR of a device based on information obtained and updated from a DOM domain controller 702. As shown, this example configures an OCF Server (the device hosting the SVR 704) as a zone controller. In this scenario, the OCF Server is already onboarded into the domain but isn't authorized to function as zone controller. The domain controller issues a credential authorizing the server and configures the resources it needs to function as zone controller.

Figure 8:
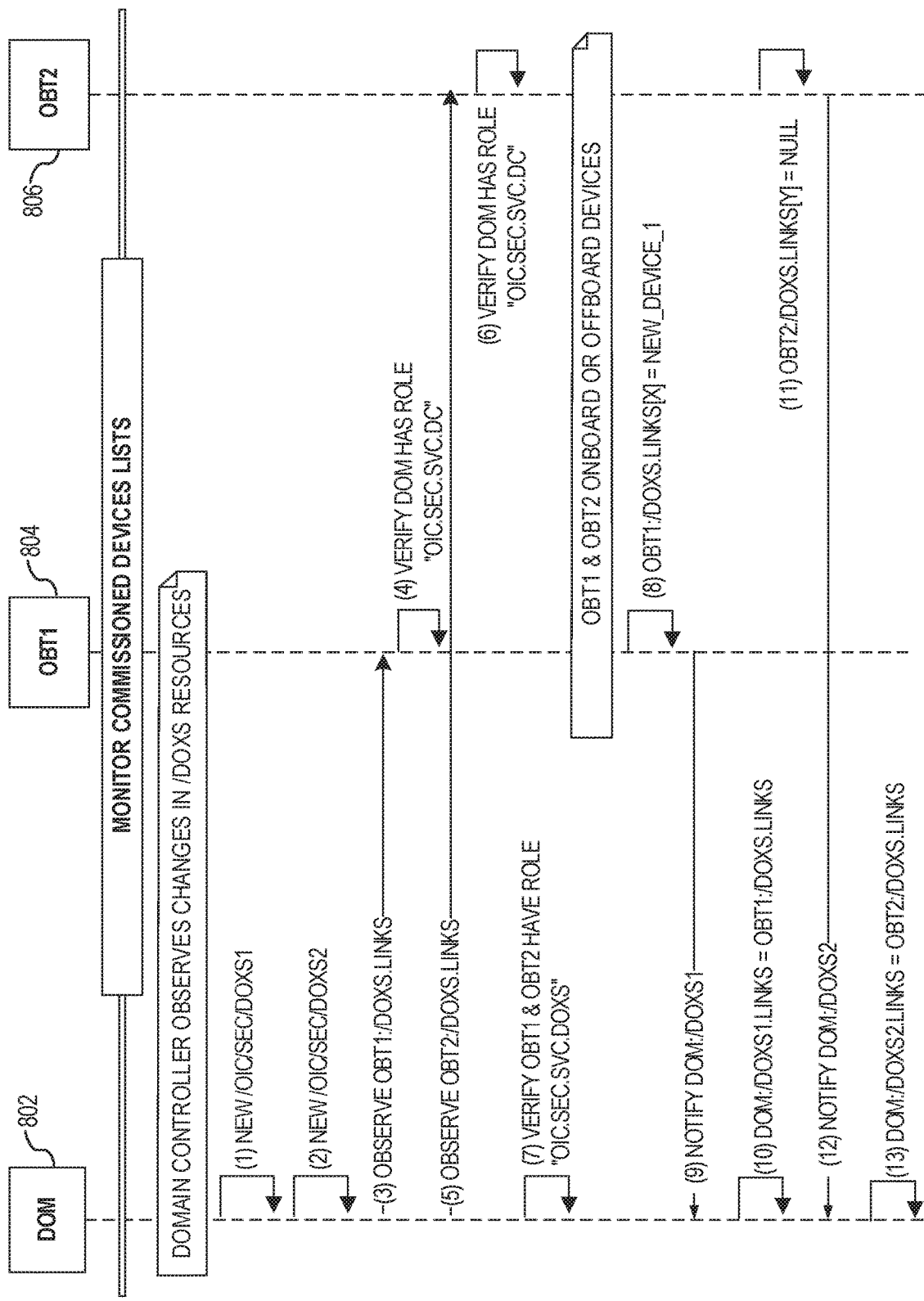
FIG. 8 illustrates a message flow for synchronizing onboarded devices lists in a domain-based network configuration, according to an embodiment.

In an example, the resource model described herein may extend to enable synchronizing a copy of the Onboarded Devices. FIG. 8 specifically illustrates example operations for synchronizing onboarded devices lists, including information between a DOM domain controller 802 and a first OBT 804 and a second OBT 806. This example shows how the domain controller 802 may periodically synchronize a list of commissioned devices with occasionally connected OBTs 804, 806.

Figure 9:
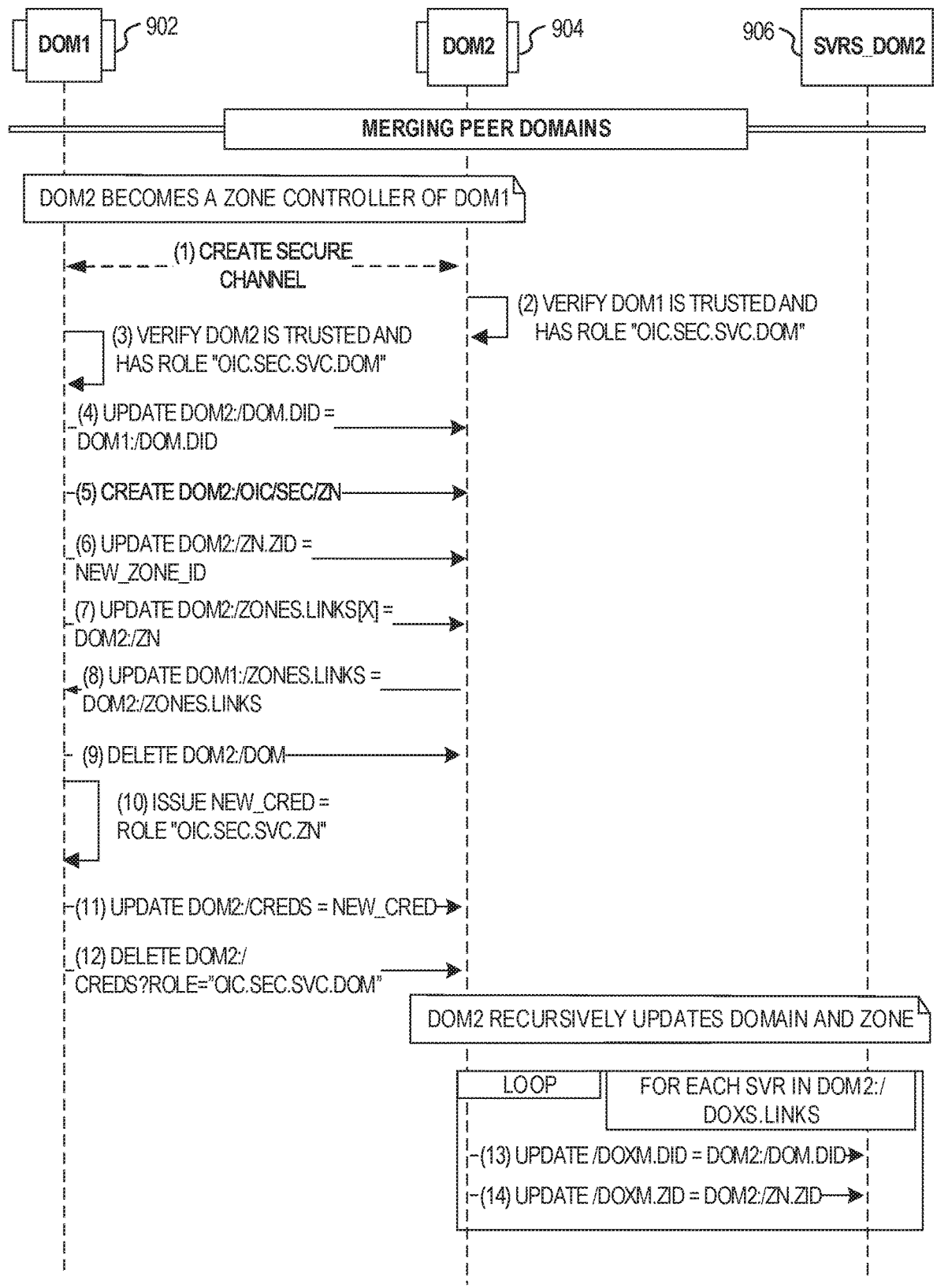
FIG. 9 illustrates a message flow for merging peer domains in a domain-based network configuration, according to an embodiment.

In an example, the resource model described herein may extend to enable merging of Peer Domains. FIG. 9 specifically illustrates example operations for merging peer domains, including operations for DOM2 domain controller 904 becoming a zone controller of DOM1 domain controller 902, as various SVRs 906 in the DOM2 domain are updated. As a result of the operations, peer domain controllers merge to form a single domain, and one domain controller becomes a zone controller of the other.

Figure 10:
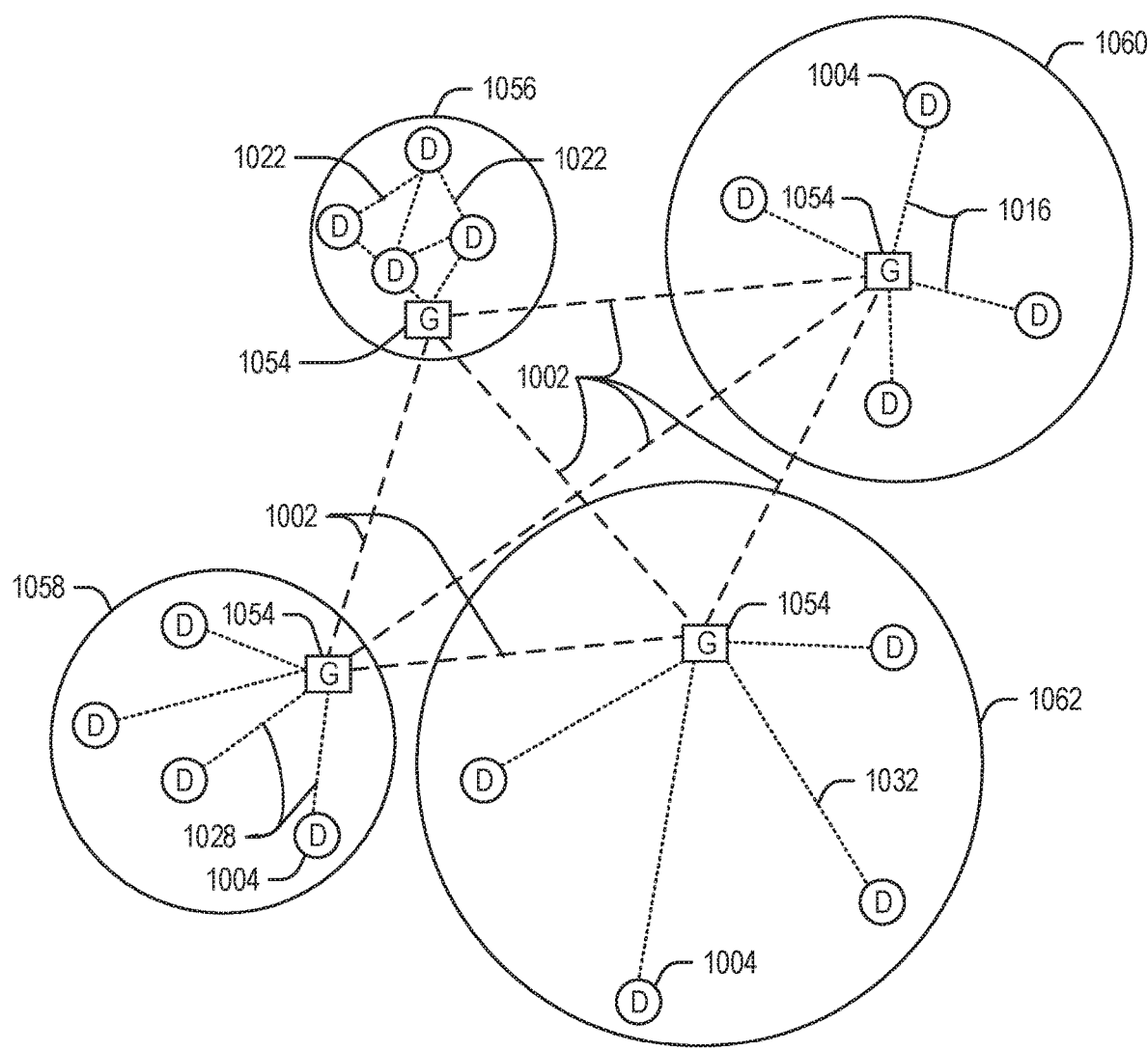
FIG. 10 illustrates a domain topology for respective internet-of-things (IoT) networks coupled through links to respective gateways, according to an embodiment.

FIG. 10 illustrates an example domain topology for respective internet-of-things (IoT) networks coupled through links to respective gateways. The Internet of Things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, enabling larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks present a number of new challenges in a heterogeneous network of connectivity comprising a combination of wired and wireless technologies.

FIG. 10 specifically provides a simplified drawing of a domain topology that may be used for a number of internet-of-things (IoT) networks comprising IoT devices 1004, with the IoT networks 1056, 1058, 1060, 1062, coupled through backbone links 1002 to respective gateways 1054. For example, a number of IoT devices 1004 may communicate with a gateway 1054, and with each other through the gateway 1054. To simplify the drawing, not every IoT device 1004, or communications link (e.g., link 1016, 1022, 1028, or 1032) is labeled. The backbone links 1002 may include any number of wired or wireless technologies, and may be part of a local area network (LAN), a wide area network (WAN), or the Internet.

The network topology may include any number of types of IoT networks, such as a mesh network provided with the network 1056 using Bluetooth low energy (BLE) links 1022. Other types of IoT networks that may be present include a wireless local area network (WLAN) network 1058 used to communicate with IoT devices 1004 through IEEE 802.11 (Wi-Fi®) links 1028, a cellular network 1060 used to communicate with IoT devices 1004 through an LTE/LTE-A (4G) or 3G cellular network, and a low-power wide area (LPWA) network 1062, for example, a LPWA network compatible with the LoRaWan specification promulgated by the LoRa alliance. Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1004, such as over the backbone links 1002, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and quality of service (QoS) based swarming and fusion of resources. Some of the individual examples of network-based resource processing include the following.

The mesh network 1056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1058, for instance, may use systems that perform standards conversion to provide multi-standard connectivity, enabling IoT devices 1004 using different protocols to communicate. Further systems may provide seamless interconnectivity across a multi-standard infrastructure comprising visible Internet resources and hidden Internet resources.

Communications in the cellular network 1060, for instance, may be enhanced by systems that offload data, extend communications to more remote devices, or both. The LPWA network 1062 may include systems that perform non-Internet protocol (IP) to IP interconnections, addressing, and routing. Further, each of the IoT devices 1004 may include the appropriate transceiver for wide area communications with that device. Further, each IoT device 1004 may include other transceivers for communications using additional protocols and frequencies.

Finally, clusters of IoT devices may be equipped to communicate with other IoT devices as well as with a cloud network. This may enable the IoT devices to form an ad-hoc network between the devices, enabling them to function as a single device, which may be termed a Fog device.

Figure 11:
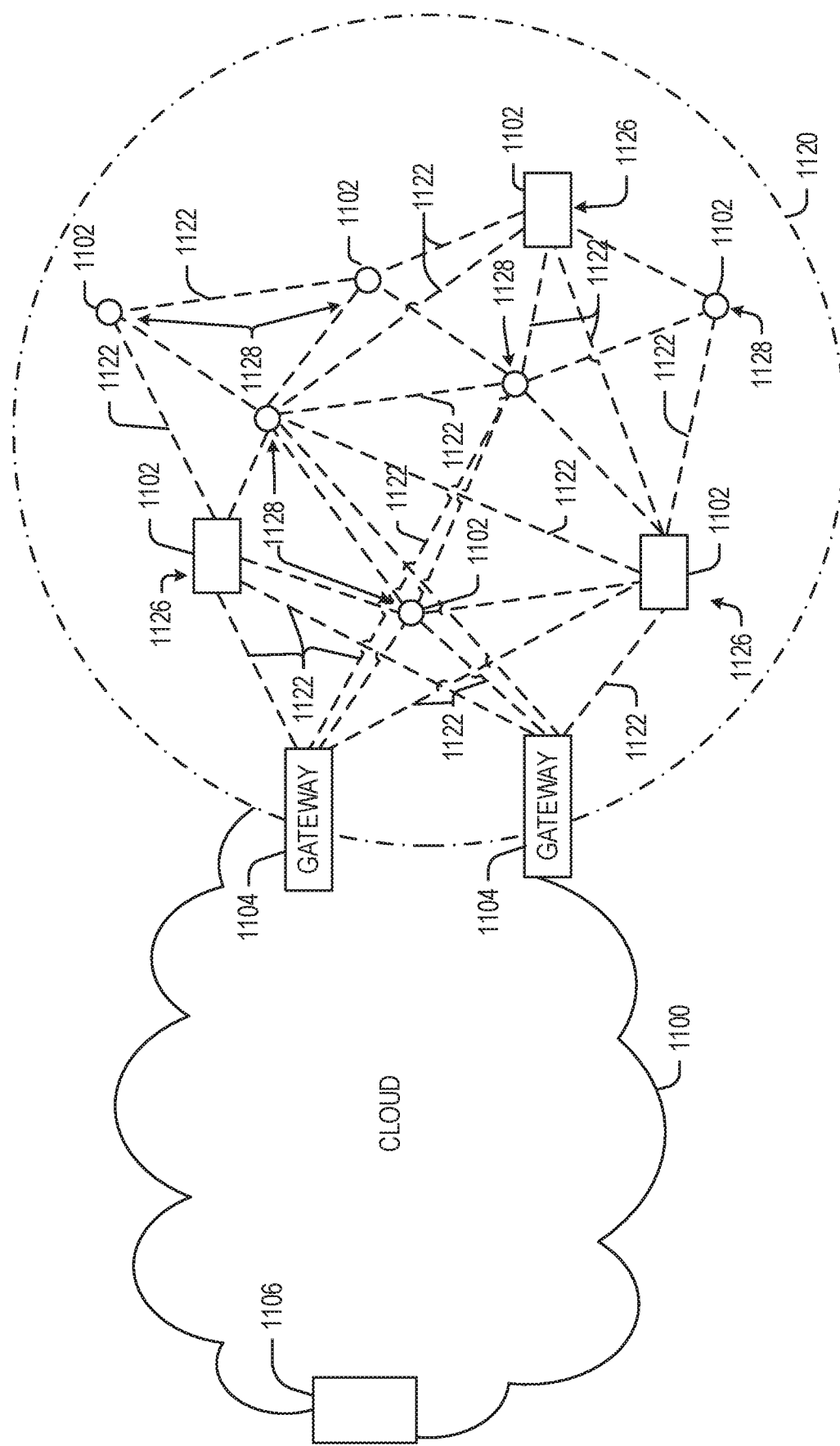
FIG. 11 illustrates a cloud computing network in communication with a mesh network of IoT devices operating as a Fog device at the edge of the cloud computing network, according to an embodiment.

FIG. 11 illustrates a cloud computing network in communication with a mesh network of IoT devices (devices 1102) operating as a Fog device at the edge of the cloud computing network. The mesh network of IoT devices may be termed a Fog 1120, operating at the edge of the cloud 1100. To simplify the diagram, not every IoT device 1102 is labeled.

The Fog 1120 may be considered to be a massively interconnected network wherein a number of IoT devices 1102 are in communications with each other, for example, by radio links 1122. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-

.M.A.N.) routing protocol, or the OMA Lightweight M2M (LWM2M) protocol, among others.

Three types of IoT devices 1102 are shown in this example, gateways 1104, data aggregators 1126, and sensors 1128, although any combinations of IoT devices 1102 and functionality may be used. The gateways 1104 may be edge devices that provide communications between the cloud 1100 and the Fog 1120, and may also provide the backend process function for data obtained from sensors 1128, such as motion data, flow data, temperature data, and the like. The data aggregators 1126 may collect data from any number of the sensors 1128, and perform the back end processing function for the analysis. The results, raw data, or both may be passed along to the cloud 1100 through the gateways 1104. The sensors 1128 may be full IoT devices 1102, for example, capable of both collecting data and processing the data. In some cases, the sensors 1128 may be more limited in functionality, for example, collecting the data and allowing the data aggregators 1126 or gateways 1104 to process the data.

Communications from any IoT device 1102 may be passed along the most convenient path between any of the IoT devices 1102 to reach the gateways 1104. In these networks, the number of interconnections provide substantial redundancy, allowing communications to be maintained, even with the loss of a number of IoT devices 1102. Further, the use of a mesh network may allow IoT devices 1102 that are very low power or located at a distance from infrastructure to be used, as the range to connect to another IoT device 1102 may be much less than the range to connect to the gateways 1104.

The Fog 1120 provided from these IoT devices 1102 may be presented to devices in the cloud 1100, such as a server 1106, as a single device located at the edge of the cloud 1100, e.g., a Fog device. In this example, the alerts coming from the Fog device may be sent without being identified as coming from a specific IoT device 1102 within the Fog 1120. In this fashion, the Fog 1120 may be considered a distributed platform that provides computing and storage resources to perform processing or data-intensive tasks such as data analytics, data aggregation, and machine-learning, among others. The Fog 1120 may operate in an ambient computing approach involving many different aspects of collecting, transferring, and using information among devices. Further, the functions and techniques disclosed herein may be distributed among multiple entities of the Fog 1120.

In some examples, the IoT devices 1102 may be configured using an imperative programming style, e.g., with each IoT device 1102 having a specific function and communication partners. However, the IoT devices 1102 forming the Fog device may be configured in a declarative programming style, allowing the IoT devices 1102 to reconfigure their operations and communications, such as to determine needed resources in response to conditions, queries, and device failures. As an example, a query from a user located at a server 1106 about the operations of a subset of equipment monitored by the IoT devices 1102 may result in the Fog 1120 device selecting the IoT devices 1102, such as particular sensors 1128, needed to answer the query. The data from these sensors 1128 may then be aggregated and analyzed by any combination of the sensors 1128, data aggregators 1126, or gateways 1104, before being sent on by the Fog 1120 device to the server 1106 to answer the query. In this example, IoT devices 1102 in the Fog 1120 may select the sensors 1128 used based on the query, such as adding data from flow sensors or temperature sensors. Further, if some of the IoT devices 1102 are not operational, other IoT devices 1102 in the Fog 1120 device may provide analogous data, if available.

Figure 12:
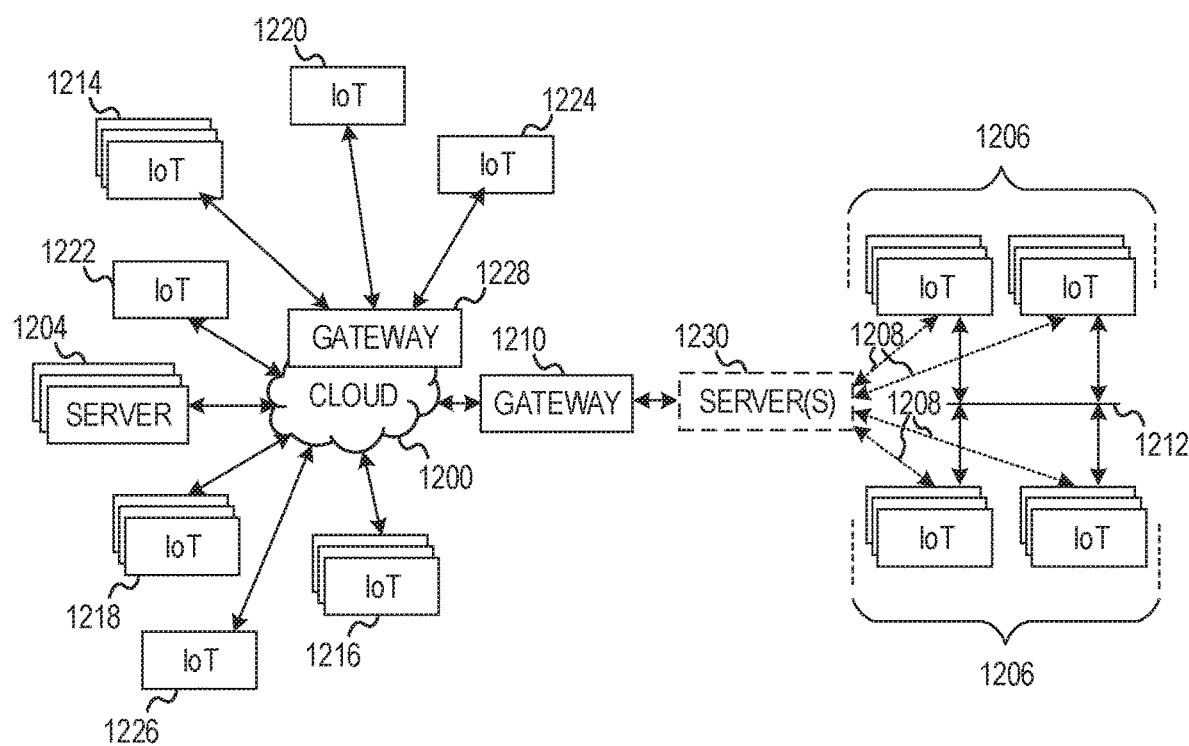
FIG. 12 illustrates a block diagram of communications among a number of IoT devices, according to an embodiment.

FIG. 12 illustrates a drawing of a cloud computing network, or cloud 1200, in communication with a number of Internet of Things (IoT) devices. The cloud 1200 may represent the Internet, or may be a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, and the like. Further, a wired or wireless sub-network 1212 may allow the IoT devices to communicate with each other, such as through a local area network, a wireless local area network, and the like. The IoT devices may use another device, such as a gateway 1210 to communicate with the cloud 1200.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT Fog device or system, or a combination therein. The groups of IoT devices may be deployed in various residential, commercial, industrial, settings (including both private or public settings).

As may be seen from FIG. 12, a large number of IoT devices may be communicating through the cloud 1200. This may allow different IoT devices to request or provide information to other devices autonomously. For example, the traffic control group 1206 may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a Fog device or system.

Figure 13:
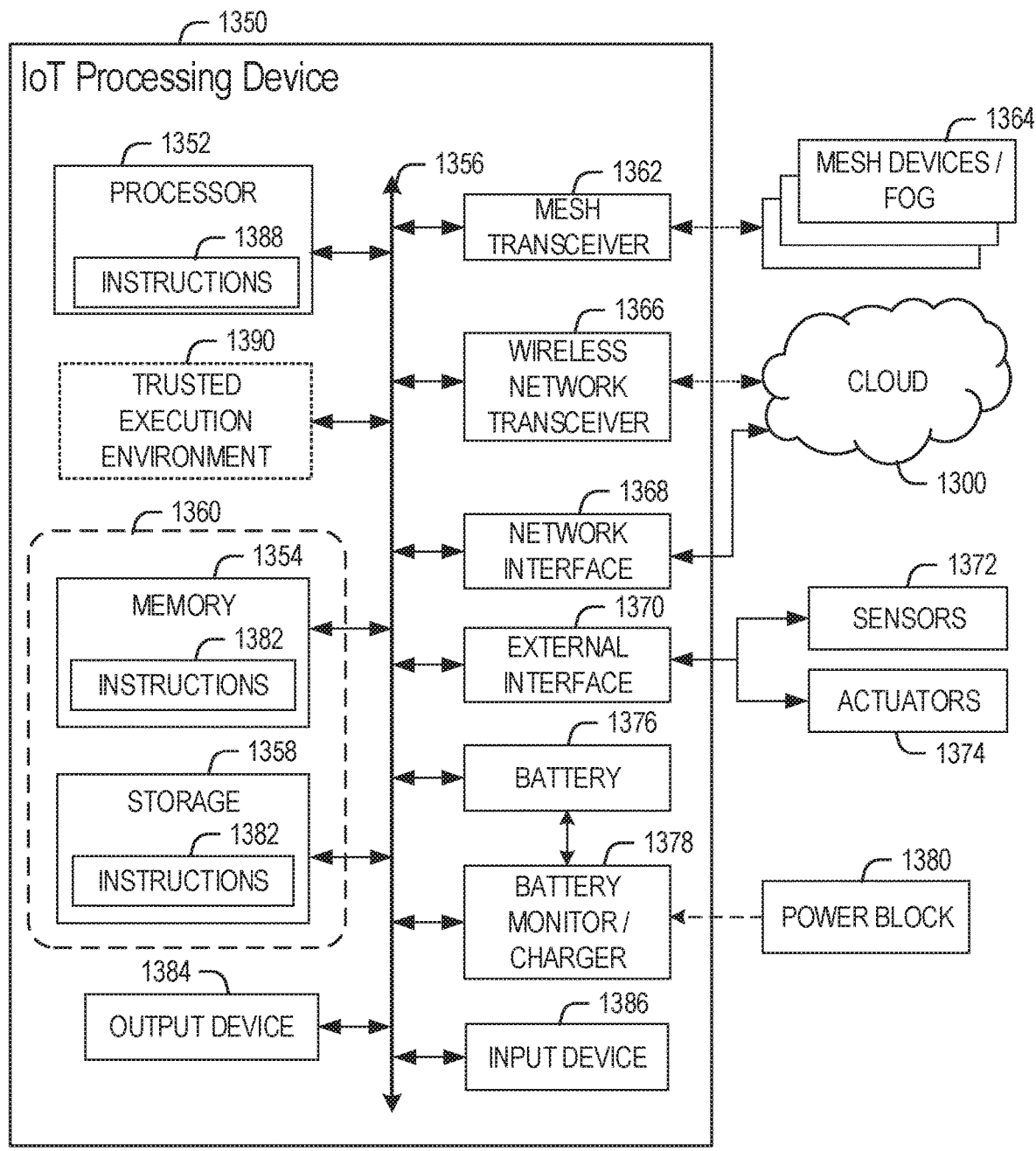
FIG. 13 illustrates a block diagram for an example IoT processing system architecture upon which any one or more of the techniques (e.g., operations, processes, methods, and methodologies) discussed herein may be performed, according to an embodiment.

FIG. 13 is a block diagram of an example of components that may be present in an IoT device 1350 for implementing the techniques described herein. The IoT device 1350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1350, or as components otherwise incorporated within a chassis of a larger system. Additionally, the block diagram of FIG. 13 is intended to depict a high-level view of components of the IoT device 1350. However, some of the components shown may be omitted, additional components may be present, and different arrangement of the components shown may occur in other implementations.

The IoT device 1350 may include a processor 1352, which may be a microprocessor, a multi-core processor, a multithreaded processor, an ultra-low voltage processor, an embedded processor, or other known processing element. The processor 1352 may be a part of a system on a chip (SoC) in which the processor 1352 and other components are formed into a single integrated circuit, or a single package, such as the Edison™ or Galileo™ SoC boards from Intel. As an example, the processor 1352 may include an Intel® Architecture Core™ based processor, such as a Quark™, an Atom™, an i3, an i5, an i7, or an MCU-class processor, or another such processor available from Intel® Corporation. Santa Clara, Calif. However, any number other processors may be used, such as available from Advanced Micro Devices, Inc. (AMD) of Sunnyvale, Calif., a MIPS-based design from MIPS Technologies. Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies. Inc., or an OMAP™ processor from Texas Instruments. Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example the storage 1358 may be implemented via a solid state disk drive (SSDD). Other devices that may be used for the storage 1358 include flash memory cards, such as SD cards, microSD cards, xD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx). PCI express (PCIe), or any number of other technologies.

The interconnect 1356 may be a proprietary bus, for example, used in a SoC based system. Other bus systems may be included, such as an I2C interface, an SPI interface, point to point interfaces, and a power bus, among others.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at different range. For example, the IoT device 1350 may communicate with close devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1366 may be included to communicate with devices or services in the cloud 1300 via local or wide area network protocols. The wireless network transceiver 1366 may be a LPWA transceiver that follows the IEEE 802.15.4, or IEEE 802.15.4g standards, among others. The IoT device 1350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1362 and 1366 may include radios that are compatible with any number of 3GPP (Third Generation Partnership Project) specifications, notably Long Term Evolution (LTE). Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to allow connect to a second network, for example, a NIC 1368 providing communications to the cloud over Ethernet, and a second NIC 1368 providing communications to other devices over another type of network.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the IoT device 1350 to actuators 1374, such as power switches, valve actuators, an audible sound generator, a visual warning device, and the like.

In some optional examples, various input/output (I/O) devices may be present within, or connected to, the IoT device 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1350.

A battery 1376 may power the IoT device 1350, although in examples in which the IoT device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the IoT device 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 1378 may communicate the information on the battery 1376 to the processor 1352 over the interconnect 1356. The battery monitor/charger 1378 may also include an analog-to-digital (ADC) convertor that allows the processor 1352 to directly monitor the voltage of the battery 1376 or the current flow from the battery 1376. The battery parameters may be used to determine actions that the IoT device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the IoT device 1350. A wireless battery charging circuit, such as an LTC4020 chip from Linear Technologies of Milpitas, Calif., among others, may be included in the battery monitor/charger 1378. The specific charging circuits chosen depend on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine readable medium 1360 including code to direct the processor 1352 to perform electronic operations in the IoT device 1350. The processor 1352 may access the non-transitory, machine readable medium 1360 over the interconnect 1356. For instance, the non-transitory, machine readable medium 1360 may be embodied by devices described for the storage 1358 of FIG. 13 or may include specific storage units such as optical disks, flash drives, or any number of other hardware devices. The non-transitory, machine readable medium 1360 may further include, provide, or invoke instructions 1388 to direct the processor 1352 to perform a specific sequence or flow of actions, for example, as described with respect to the flowchart(s) and block diagram(s) of operations and functionality depicted above.

In an example, the instructions 1388 on the processor 1352 (separately, or in combination with the instructions 1388 of the machine readable medium 1360) may configure execution or operation of a trusted execution environment (TEE) 1390. In an example, the TEE 1390 operates as a protected area accessible to the processor 1352 to enable secure access to data and secure execution of instructions. Various implementations of the TEE 1390, and an accompanying secure area in the processor 1352 or the memory 1354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1350 through the TEE 1390 and the processor 1352.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks: magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Figure 14:
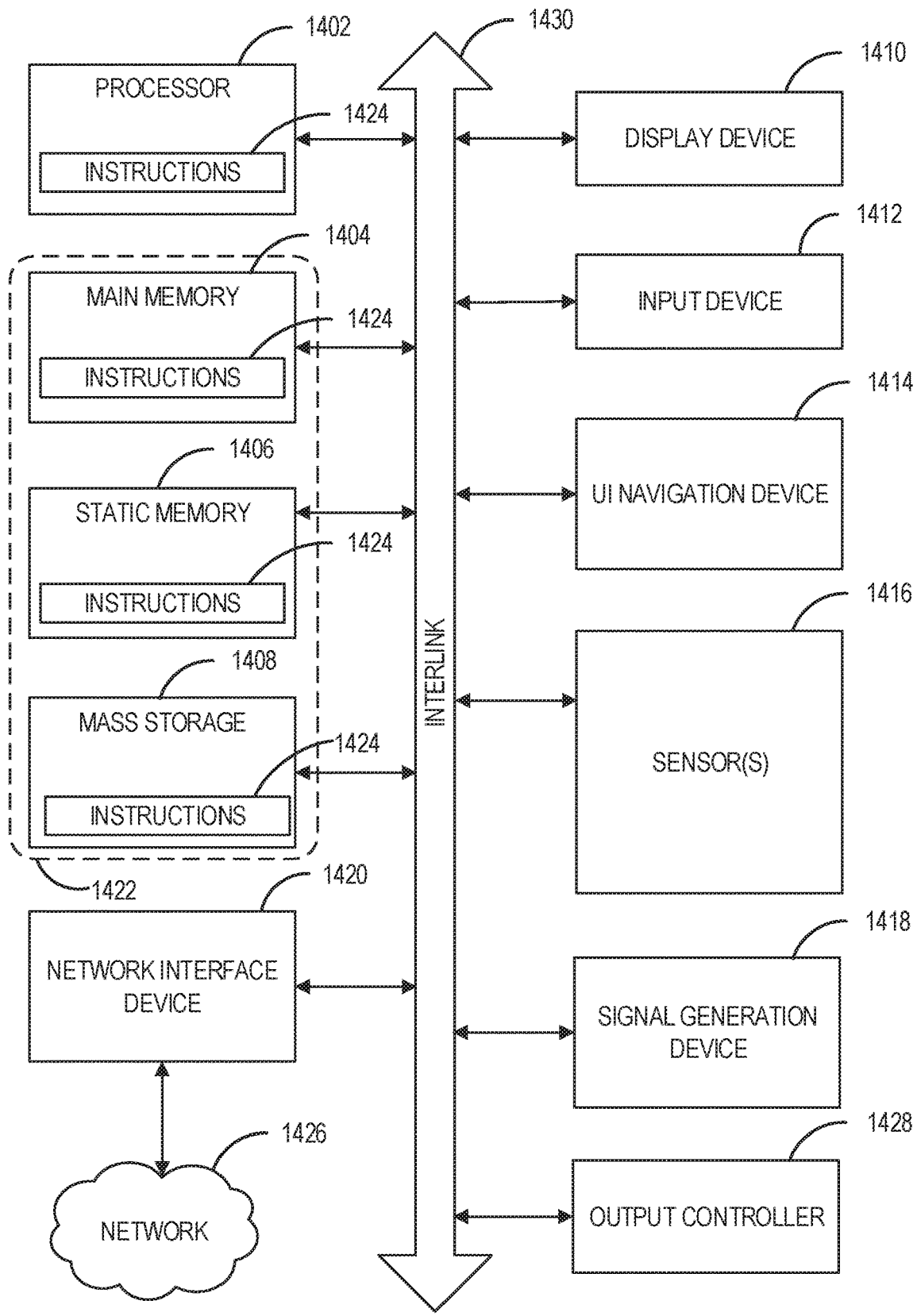
FIG. 14 is a block diagram illustrating an example of a machine upon which one or more embodiments may be implemented.

FIG. 14 illustrates a block diagram of an example machine 1400 upon which any one or more of the techniques (e.g., methodologies) discussed herein may perform. Examples, as described herein, may include, or may operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1400 follow.

In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1400 may include a hardware processor 1402 (e.g., a central processing unit (CPU), a graphics processing unit (GPU), a hardware processor core, or any combination thereof), a main memory 1404, a static memory (e.g., memory or storage for firmware, microcode, a basic-input-output (BIOS), unified extensible firmware interface (UEFI), etc.) 1406, and mass storage 1408 (e.g., hard drive, tape drive, flash storage, or other block devices) some or all of which may communicate with each other via an interlink (e.g., bus) 1430. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1408, a signal generation device 1418 (e.g., a speaker), a network interface device 1420, and one or more sensors 1416, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1402, the main memory 1404, the static memory 1406, or the mass storage 1408 may be, or include, a machine readable medium 1422 on which is stored one or more sets of data structures or instructions 1424 (e.g., software) embodying or utilized by any one or more of the techniques or functions described herein. The instructions 1424 may also reside, completely or at least partially, within any of registers of the processor 1402, the main memory 1404, the static memory 1406, or the mass storage 1408 during execution thereof by the machine 1400. In an example, one or any combination of the hardware processor 1402, the main memory 1404, the static memory 1406, or the mass storage 1408 may constitute the machine readable media 1422. While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third," etc. are used merely as labels, and are not intended to impose numerical requirements on their objects.

Additional examples of the presently described method, system, and device embodiments are suggested according to the structures and techniques described above, and specified in the following examples and claims.

Example 1 is a device operable in an Internet of Things (IoT) network, comprising: communications circuitry; processing circuitry; and at least one storage device including instructions embodied thereon, wherein the instructions, which when executed by the processing circuitry, configure the processing circuitry to perform operations for implementing management functions of the device in a domain of the IoT network, the operations to: define a resource structure in a secure virtual resource of the device, the resource structure to identify at least one management service of the device, wherein the resource structure defines at least one management service resource that corresponds to the at least one management service, and wherein the at least one management service resource is defined in a hierarchy under a domain resource; establish properties of the at least one management service resource on the device within the resource structure, wherein the properties are associated with a management function to be performed in the domain; and operate the device in the domain according to the management function.

In Example 2, the subject matter of Example 1 includes, wherein the management function is controlled by a management service operating within the domain, and wherein the domain resource is controlled by a domain management service operating within the domain.

In Example 3, the subject matter of Example 2 includes, wherein the management service operates on the device, and wherein the domain management service operates on another device in the domain.

In Example 4, the subject matter of Example 3 includes, wherein the at least one management service resource is used to initiate the management service on the device, and wherein the instructions further configure the processing circuitry to initiate the management service on the device, with operations to: onboard the device; register a user for the device; establish the at least one management service resource on the device to fulfill an administrative role of the management service; obtain a credential that authorizes the user and the device to perform the management function in connection with the at least one management service; provision code on the device to perform the management function: and invoke the code on the device to perform the management function.

In Example 5, the subject matter of Examples 1-4 includes, wherein the at least one management service includes at least one of: a device onboarding service, an access management service, a credential management service, or a software update management service.

In Example 6, the subject matter of Examples 1-5 includes, wherein the at least one management service resource is further defined under a zone resource, wherein the zone resource is defined under the domain resource, wherein a respective zone defined by the zone resource includes a plurality of devices in the domain that operate in accordance with common service characteristics, and wherein the domain includes at least one zone including the respective zone.

In Example 7, the subject matter of Examples 1-6 includes, wherein the device operates the management function in response to an onboarding tool delegation, a zone controller delegation, or a domain controller delegation.

In Example 8, the subject matter of Examples 1-7 includes, wherein the at least one management service includes an onboarding tool service, wherein the onboarding tool service is operated by the device in the domain in response to deployment of the device as a first device in the domain.

In Example 9, the subject matter of Examples 1-8 includes, wherein the device is onboarded onto the domain by an onboarding tool service accessible within the domain.

In Example 10, the subject matter of Examples 1-9 includes, wherein the device requests onboarding tool service privileges from a domain controller indicated in the domain resource, wherein the device performs the management function in response to receiving the onboarding tool service privileges from the domain controller, and wherein the management function includes at least one onboarding tool service function.

In Example 11, the subject matter of Examples 1-10 includes, wherein, in response to receiving a zone controller delegation from a domain controller, the management function performed by the device includes at least one zone controller service function.

In Example 12, the subject matter of Examples 1-11 includes, wherein communications in the IoT network to perform the operations are conducted according to one or more Open Connectivity Foundation (OCF) specifications, and wherein one or more of the communications comprise Representational State Transfer (RESTful) interactions among one or more IoT network topologies.

Example 13 is an Internet of Things (IoT) network, comprising: a plurality of server devices operating in a domain, each device of the plurality of server devices configured to implement management functions, with each device to: receive a definition of a resource structure for a secure virtual resource of the respective device, the resource structure to identify at least one management service of the respective device, wherein the resource structure defines at least one management service resource that corresponds to the at least one management service, and wherein the at least one management service resource is defined in a hierarchy under a network domain resource for a network domain; establish properties of the at least one management service resource on the respective device within the resource structure, wherein the properties are associated with a management function to be performed in the network domain; and operate the respective device in the network domain according to the management function; and an onboarding tool device, the onboarding tool device to provide an onboarding tool to perform onboarding of each respective device onto the domain.

In Example 14, the subject matter of Example 13 includes, a domain controller device, configured to operate as a domain controller for the network domain, wherein the network domain resource indicates the domain controller device as the domain controller.

In Example 15, the subject matter of Examples 13-14 includes, a zone controller device, configured to operate as a zone controller in the network domain, wherein the network domain includes a plurality of zones, wherein the plurality of server devices are part of a first zone, and wherein a second plurality of server devices are part of second zone.

In Example 16, the subject matter of Examples 13-15 includes, a collaboration environment server, the collaboration environment server to host respective shadow devices in a collaboration environment, wherein the respective shadow devices represent the plurality of server devices, and wherein access to respective management services of the plurality of server devices are provided via the respective shadow devices.

In Example 17, the subject matter of Example 16 includes, a directory resource server, configured to operate as a directory of resources among the plurality of server devices, wherein the directory resource server provides access to the respective shadow devices to a remote cloud service.

Example 18 is a method, comprising a plurality of operations executed with processing circuitry of a device, to implement management functions of the device in a domain of an Internet of Things (IoT) network, the operations comprising: defining a resource structure in a secure virtual resource of the device, the resource structure to identify at least one management service of the device, wherein the resource structure defines at least one management service resource that corresponds to the at least one management service, and wherein the at least one management service resource is defined in a hierarchy under a domain resource; establishing properties of the at least one management service resource on the device within the resource structure, wherein the properties are associated with a management function to be performed in the domain; and operating the device in the domain according to the management function.

In Example 19, the subject matter of Example 18 includes, wherein the management function is controlled by a management service operating within the domain, and wherein the domain resource is controlled by a domain management service operating within the domain.

In Example 20, the subject matter of Example 19 includes, wherein the management service operates on the device, and wherein the domain management service operates on another device in the domain.

In Example 21, the subject matter of Example 20 includes, wherein the at least one management service resource is used to cause initiating of the management service on the device, wherein initiating the management service on the device comprises: onboarding the device; registering a user for the device; establishing the at least one management service resource on the device to fulfill an administrative role of the management service; obtaining a credential that authorizes the user and the device to perform the management function in connection with the at least one management service; provisioning code on the device to perform the management function; and invoking the code on the device to perform the management function.

In Example 22, the subject matter of Examples 18-21 includes, wherein the at least one management service includes at least one of: a device onboarding service, an access management service, a credential management service, or a software update management service.

In Example 23, the subject matter of Examples 18-22 includes, wherein the at least one management service resource is further defined under a zone resource, wherein the zone resource is defined under the domain resource, wherein a respective zone defined by the zone resource includes a plurality of devices in the domain that operate in accordance with common service characteristics, and wherein the domain includes at least one zone including the respective zone.

In Example 24, the subject matter of Examples 18-23 includes, wherein the device operates the management function in response to an onboarding tool delegation, a zone controller delegation, or a domain controller delegation.

In Example 25, the subject matter of Examples 18-24 includes, wherein the at least one management service includes an onboarding tool service, wherein the onboarding tool service is operated by the device in the domain in response to deployment of the device as a first device in the domain.

In Example 26, the subject matter of Examples 18-25 includes, wherein the device is onboarded onto the domain by an onboarding tool service accessible within the domain.

In Example 27, the subject matter of Examples 18-26 includes, wherein the device requests onboarding tool service privileges from a domain controller indicated in the domain resource, wherein the device performs the management function in response to receiving the onboarding tool service privileges from the domain controller, and wherein the management function includes at least one onboarding tool service function.

In Example 28, the subject matter of Examples 18-27 includes, wherein, in response to receiving a zone controller delegation from a domain controller, the management function performed by the device includes at least one zone controller service function.

In Example 29, the subject matter of Examples 18-28 includes, wherein communications in the IoT network to perform the operations are conducted according to one or more Open Connectivity Foundation (OCF) specifications, and wherein one or more of the communications comprise Representational State Transfer (RESTful) interactions among one or more IoT network topologies.

Example 30 is a device-readable storage medium including instructions, wherein the instructions, when executed by a processing circuitry of a device, cause the processing circuitry to perform operations of any of Examples 18 to 29.

Example 31 is an apparatus, adapted to implement management functions of the device in a domain of an Internet of Things (IoT) network, the apparatus comprising: means for defining a resource structure in a secure virtual resource of the apparatus, the resource structure to identify at least one management service of the apparatus, wherein the resource structure defines at least one management service resource that corresponds to the at least one management service, and wherein the at least one management service resource is defined in a hierarchy under a domain resource; means for establishing properties of the at least one management service resource on the apparatus within the resource structure, wherein the properties are associated with a management function to be performed in the domain; and means for operating the apparatus in the domain according to the management function.

In Example 32, the subject matter of Example 31 includes, means for receiving control of the management function from a management service operating within the domain; and means for receiving control of the domain resource from a domain management service operating within the domain.

In Example 33, the subject matter of Example 32 includes, means for operating the management service on the apparatus, wherein the domain management service operates on another device in the domain.

In Example 34, the subject matter of Example 33 includes, means for using the at least one management service resource to initiate the management service on the device; and means for initiating the management service on the device, with operations to: onboard the device; register a user for the device; establish the at least one management service resource on the device to fulfill an administrative role of the management service; obtain a credential that authorizes the user and the device to perform the management function in connection with the at least one management service; provision code on the device to perform the management function; and invoke the code on the device to perform the management function.

In Example 35, the subject matter of Examples 31-34 includes, means for operating the at least one management service, the at least one management service including at least one of: a device onboarding service, an access management service, a credential management service, or a software update management service.

In Example 36, the subject matter of Examples 31-35 includes, means for operating the at least one management service, wherein the at least one management service resource is further defined under a zone resource, wherein the zone resource is defined under the domain resource, wherein a respective zone defined by the zone resource includes a plurality of devices in the domain that operate in accordance with common service characteristics, and wherein the domain includes at least one zone including the respective zone.

In Example 37, the subject matter of Examples 31-36 includes, means for operating the at least one management service, wherein the apparatus operates the management function in response to an onboarding tool delegation, a zone controller delegation, or a domain controller delegation.

In Example 38, the subject matter of Examples 31-37 includes, means for operating the at least one management service, wherein the at least one management service includes an onboarding tool service, and wherein the onboarding tool service is operated by the apparatus in the domain in response to deployment of the apparatus as a first device in the domain.

In Example 39, the subject matter of Examples 31-38 includes, means for receiving onboarding commands, wherein the apparatus is onboarded onto the domain by an onboarding tool service accessible within the domain.

In Example 40, the subject matter of Examples 31-39 includes, means for requesting onboarding tool service privileges from a domain controller indicated in the domain resource: and means for performing the management function in response to receiving the onboarding tool service privileges from the domain controller, wherein the management function includes at least one onboarding tool service function.

In Example 41, the subject matter of Examples 31-40 includes, means for performing, in response to receiving a zone controller delegation from a domain controller, the management function, wherein the management function includes at least one zone controller service function.

In Example 42, the subject matter of Examples 31-41 includes, means for conducting communications in the IoT network, according to one or more Open Connectivity Foundation (OCF) specifications, wherein one or more of the communications comprise Representational State Transfer (RESTful) interactions among one or more IoT network topologies.

Example 43 is a device Fog, cloud, system, or network arrangement operating as a domain, comprising respective devices adapted to perform the operations of any of Examples 1 to 42.

Example 44 is a cloud service server adapted to perform the operations of a cloud service invoked by any of Examples 1 to 42.

Example 45 is an edge computing device adapted to perform the operations of a client device invoked by any of Examples 1 to 42.

Example 46 is a credential management service server adapted to perform operations of credentialing invoked by any of Examples 1 to 42.

Example 47 is an authentication management service server adapted to perform operations of authentication invoked by any of Examples 1 to 42.

Example 48 is a device onboarding service server adapted to perform operations of onboarding invoked by any of Examples 1 to 42.

Example 49 is an Open Connectivity Foundation (OCF) device, configured as a server, client, or intermediary according to an OCF specification, comprising means to implement the operations of any of Examples 1 to 42.

Example 50 is an Internet of Things (IoT) network topology, the IoT network topology comprising respective communication links adapted to perform communications for the operations of any of Examples 1 to 42.

Example 51 is a network comprising respective devices and device communication mediums for performing any of the operations of Examples 1 to 42.

1 Example 52 is an apparatus comprising means for performing any of the operations of Examples 1 to 42.

Example 53 is a system to perform the operations of any of Examples 1 to 52.

Example 54 is a method to perform the operations of any of Examples 1 to 52.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device operable in an Internet of Things (IoT) network, comprising:
   communications circuitry;
   processing circuitry; and
   at least one storage device comprising instructions embodied thereon, wherein the instructions, which when executed by the processing circuitry, configure the processing circuitry to perform operations that implement management functions of the device in a domain of the IoT network, the operations to:
   define a resource data structure in a secure virtual resource of the device, the resource structure to identify at least one resource management service of the device, wherein the resource structure defines at least one management service resource that corresponds to the at least one resource management service, and wherein the at least one management service resource is defined in a hierarchy under a zone resource, the zone resource defined in the hierarchy under a domain resource;
   establish properties of the at least one management service resource on the device within the resource structure, wherein the properties are associated with a management function to be performed in the domain;
assign the at least one resource management service to perform a device lifecycle operation, a user lifecycle operation, and a security management operation, wherein to assign the at least one resource management service includes assigning a first resource management service to perform the device lifecycle operation and a second resource management service to perform the user lifecycle operation, and wherein the first resource management service and the second resource management service are distinct from one another; and
cause the device to operate in the zone of the domain according to the management function.

2. The device of claim 1, wherein the management function is controlled by a management service that operates within the domain, and wherein the domain resource is controlled by a domain management service that operates within the domain.

3. The device of claim 2, wherein the management service operates on the device, and wherein the domain management service operates on another device in the domain.

4. The device of claim 3, wherein the at least one management service resource is used to initiate the management service on the device, and wherein the instructions further configure the processing circuitry to initiate the management service on the device, with operations to:
onboard the device;
register a user for the device;
establish the at least one management service resource on the device to fulfill an administrative role of the management service;
obtain a credential that authorizes the user and the device to perform the management function in connection with the at least one management service;
provision code on the device to perform the management function; and
invoke the code on the device to perform the management function.

5. The device of claim 1, wherein the at least one management service includes at least one of: a device onboarding service, an access management service, a credential management service, or a software update management service.

6. The device of claim 1, wherein the at least one management service resource is further defined under a zone resource, wherein the zone resource is defined under the domain resource, wherein a respective zone defined by the zone resource includes a plurality of devices in the domain that operate in accordance with common service characteristics, and wherein the domain includes at least one zone including the respective zone.

7. The device of claim 1, wherein the device operates the management function in response to an onboarding tool delegation, a zone controller delegation, or a domain controller delegation.

8. The device of claim 1, wherein the at least one management service includes an onboarding tool service, wherein the onboarding tool service is operated by the device in the domain in response to deployment of the device as a first device in the domain.

9. The device of claim 1, wherein the device is onboarded onto the domain by an onboarding tool service accessible within the domain.

10. The device of claim 1, wherein the device requests onboarding tool service privileges from a domain controller indicated in the domain resource, wherein the device performs the management function in response to receipt of the onboarding tool service privileges from the domain controller, and wherein the management function includes at least one onboarding tool service function.

11. The device of claim 1, wherein, in response to receipt of a zone controller delegation from a domain controller, the management function performed by the device includes at least one zone controller service function.

12. The device of claim 1, wherein communications in the IoT network to perform the operations are conducted according to one or more Open Connectivity Foundation (OCF) specifications, and wherein one or more of the communications comprise Representational State Transfer (RESTful) interactions among one or more IoT network topologies.

13. The device of claim 1, wherein the device lifecycle operation includes at least one of adding a second device, maintaining the second device, or removing the second device.

14. The device of claim 1, wherein the user lifecycle operation includes adding a user, maintaining the user, or removing the user.

15. A method, comprising a plurality of operations executed with processing circuitry of a device, to implement management functions of the device in a domain of an Internet of Things (IoT) network, the operations comprising:
defining a resource data structure in a secure virtual resource of the device, the resource structure to identify at least one resource management service of the device, wherein the resource structure defines at least one management service resource that corresponds to the at least one resource management service, and wherein the at least one management service resource is defined in a hierarchy under a zone resource, the zone resource defined in the hierarchy under a domain resource;
establishing properties of the at least one management service resource on the device within the resource structure, wherein the properties are associated with a management function to be performed in the domain;
assigning the at least one resource management service to perform a device lifecycle operation, a user lifecycle operation, and a security management operation, wherein assigning the at least one resource management service includes assigning a first resource management service to perform the device lifecycle operation and a second resource management service to perform the user lifecycle operation, and wherein the first resource management service and the second resource management service are distinct from one another; and
enabling the device to operate in the zone of the domain according to the management function.

16. The method of claim 15, wherein the at least one management service resource is used to cause initiating of a management service on the device, wherein initiating the management service on the device comprises:
onboarding the device;
registering a user for the device;
establishing the at least one management service resource on the device to fulfill an administrative role of the management service;
obtaining a credential that authorizes the user and the device to perform the management function in connection with the at least one management service;

provisioning code on the device to perform the management function; and invoking the code on the device to perform the management function.

17. The method of claim 15, wherein the at least one management service includes at least one of: a device onboarding service, an access management service, a credential management service, or a software update management service.

18. The method of claim 15, wherein the at least one management service resource is further defined under a zone resource, wherein the zone resource is defined under the domain resource, wherein a respective zone defined by the zone resource includes a plurality of devices in the domain that operate in accordance with common service characteristics, and wherein the domain includes at least one zone including the respective zone.

19. The method of claim 15, wherein the device operates the management function in response to an onboarding tool delegation, a zone controller delegation, or a domain controller delegation.

20. The method of claim 15, wherein the device requests onboarding tool service privileges from a domain controller indicated in the domain resource, wherein the device performs the management function in response to receiving the onboarding tool service privileges from the domain controller, and wherein the management function includes at least one onboarding tool service function.

21. The method of claim 15, wherein communications in the IoT network to perform the operations are conducted according to one or more Open Connectivity Foundation (OCF) specifications, and wherein one or more of the communications comprise Representational State Transfer (RESTful) interactions among one or more IoT network topologies.

22. At least one non-transitory device-readable storage medium comprising instructions, wherein the instructions, when executed by a processing circuitry of a device, cause the processing circuitry to perform operations to implement management functions of the device in a domain of an Internet of Things (IoT) network, the operations comprising:

defining a resource data structure in a secure virtual resource of the device, the resource structure to identify at least one resource management service of the device, wherein the resource structure defines at least one management service resource that corresponds to the at least one resource management service, and wherein the at least one management service resource is defined in a hierarchy under a zone resource, the zone resource defined in the hierarchy under a domain resource;

establishing properties of the at least one management service resource on the device within the resource structure, wherein the properties are associated with a management function to be performed in the domain;

assigning the at least one resource management service to perform a device lifecycle operation, a user lifecycle operation, and a security management operation, wherein assigning the at least one resource management service includes assigning a first resource management service to perform the device lifecycle operation and a second resource management service to perform the user lifecycle operation, and wherein the first resource management service and the second resource management service are distinct from one another; and in response to the assigning, causing the device to be configured to operate in the zone of the domain according to the management function.

23. The device-readable storage medium of claim 22, wherein the at least one management service resource is used to cause initiating of a management service on the device, wherein initiating the management service on the device comprises:

onboarding the device;

registering a user for the device;

establishing the at least one management service resource on the device to fulfill an administrative role of the management service;

obtaining a credential that authorizes the user and the device to perform the management function in connection with the at least one management service;

provisioning code on the device to perform the management function; and invoking the code on the device to perform the management function.

24. The device-readable storage medium of claim 22, wherein the at least one management service includes at least one of: a device onboarding service, an access management service, a credential management service, or a software update management service.

25. The device-readable storage medium of claim 22, wherein the at least one management service resource is further defined under a zone resource, wherein the zone resource is defined under the domain resource, wherein a respective zone defined by the zone resource includes a plurality of devices in the domain that operate in accordance with common service characteristics, and wherein the domain includes at least one zone including the respective zone.

26. The device-readable storage medium of claim 22, wherein the device operates the management function in response to an onboarding tool delegation, a zone controller delegation, or a domain controller delegation.

27. The device-readable storage medium of claim 22, wherein the device requests onboarding tool service privileges from a domain controller indicated in the domain resource, wherein the device performs the management function in response to receiving the onboarding tool service privileges from the domain controller, and wherein the management function includes at least one onboarding tool service function.

* * * * *

UNITED STATES PATENT AND TRADEMARK OFFICE
CERTIFICATE OF CORRECTION

| | |
|---|---|
| PATENT NO. | : 11,601,436 B2 |
| APPLICATION NO. | : 16/609711 |
| DATED | : March 7, 2023 |
| INVENTOR(S) | : Smith et al. |

It is certified that error appears in the above-identified patent and that said Letters Patent is hereby corrected as shown below:

On the Title Page

On page 2, in Column 2, under "Other Publications", Line 1, delete "Specfication" and insert --Specification-- therefor Signed and Sealed this
Fifteenth Day of October, 2024

Katherine Kelly Vidal
*Director of the United States Patent and Trademark Office*